C. F. LAGANKE.
AUDITING AND FILING APPARATUS.
APPLICATION FILED JULY 1, 1912.

1,235,701.

Patented Aug. 7, 1917.
14 SHEETS—SHEET 6.

Witnesses
Edwin L. Bradford
C. W. Lord.

Inventor
Charles F. Laganke
Geo. B. Pitts
Attorney

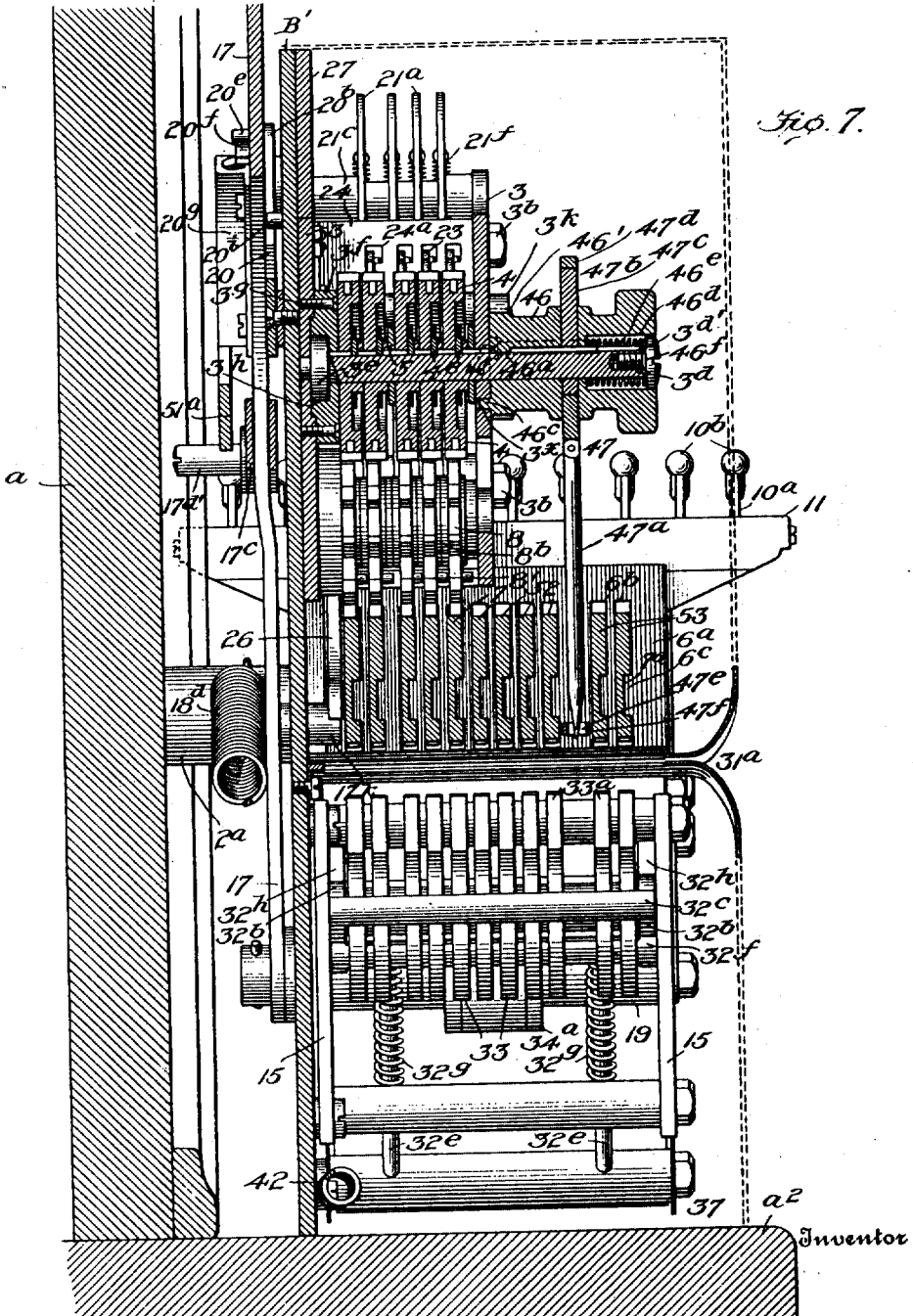

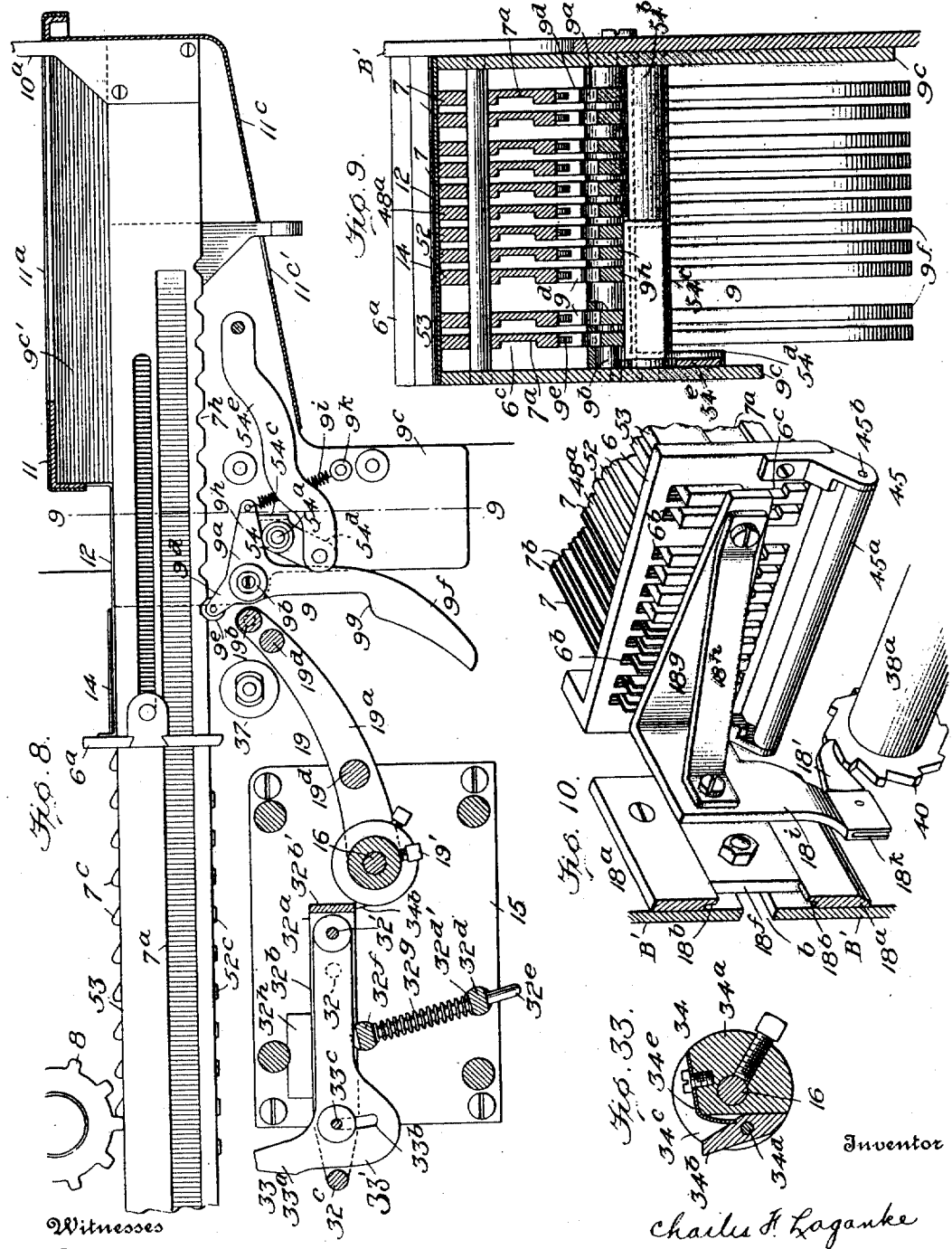

C. F. LAGANKE.
AUDITING AND FILING APPARATUS.
APPLICATION FILED JULY 1, 1912.
1,235,701.
Patented Aug. 7, 1917.
14 SHEETS—SHEET 9.
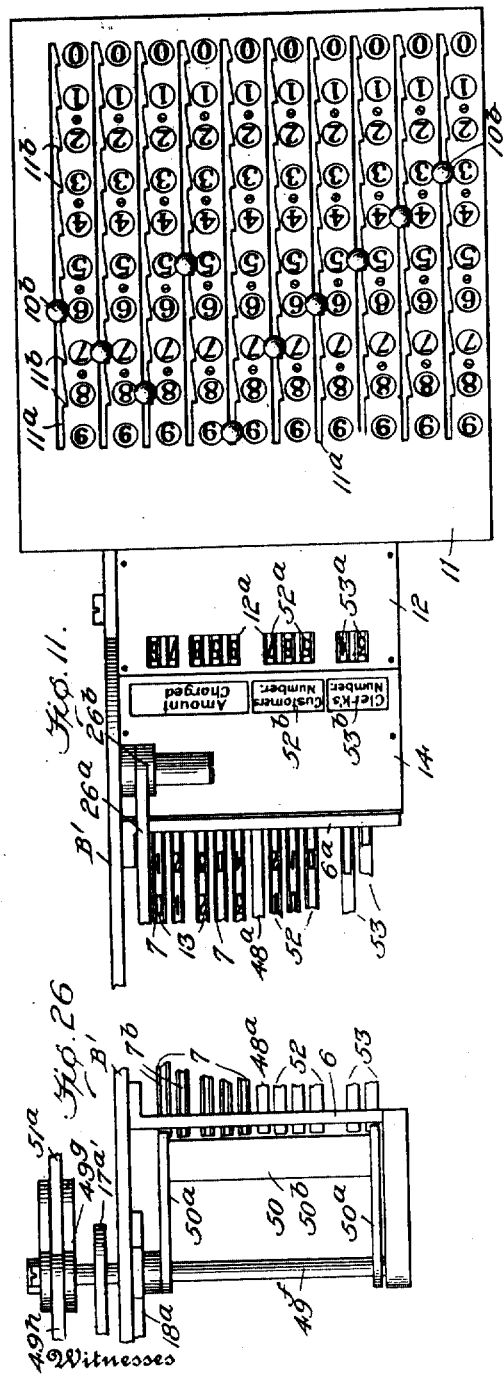
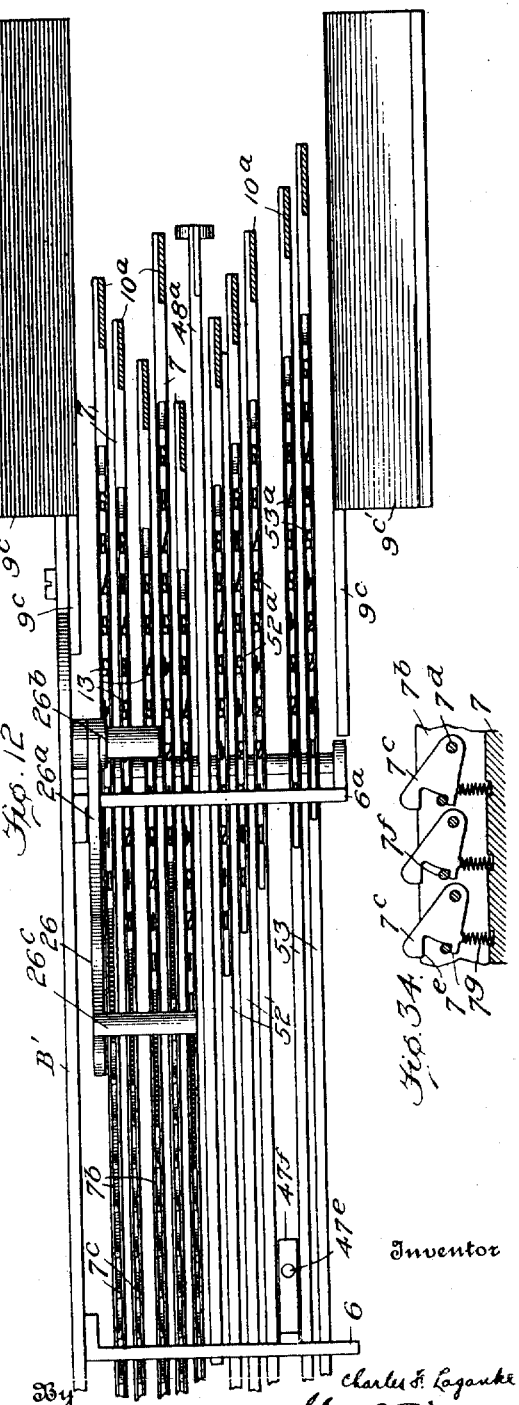
Witnesses
Edwin L. Bradford
C. D. Lord.
Inventor
Charles F. Laganke
Geo. B. Pitts
Attorney

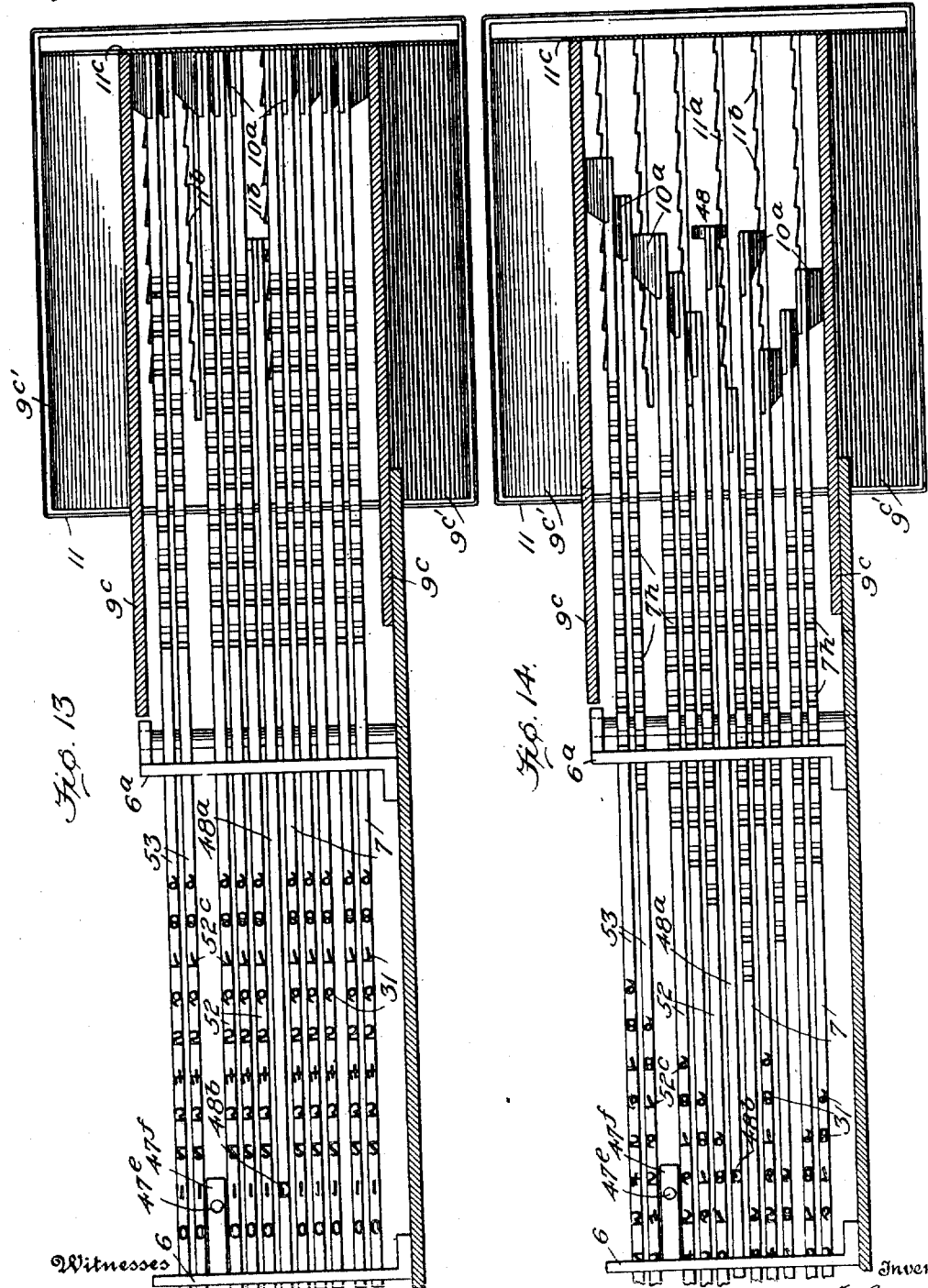

C. F. LAGANKE.
AUDITING AND FILING APPARATUS.
APPLICATION FILED JULY 1, 1912.
1,235,701.
Patented Aug. 7, 1917.
14 SHEETS—SHEET 11.
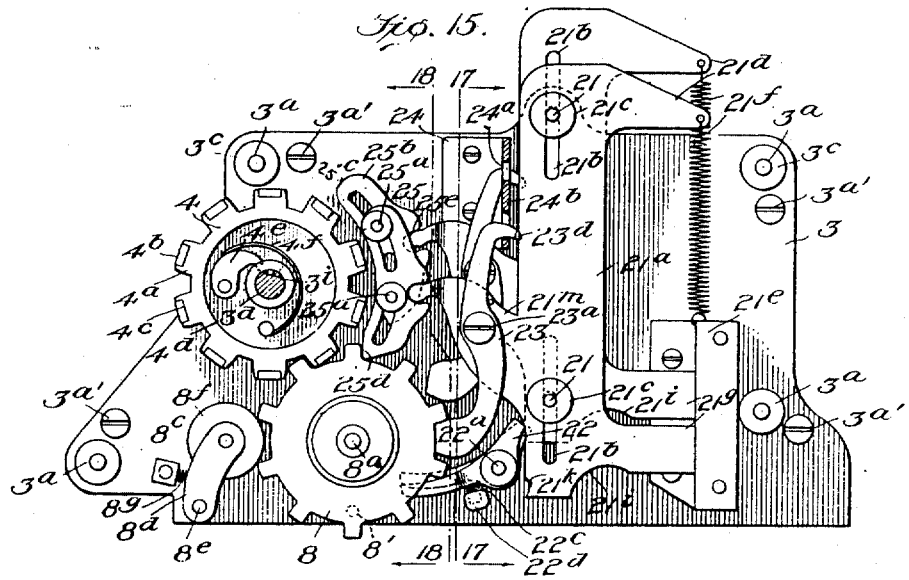
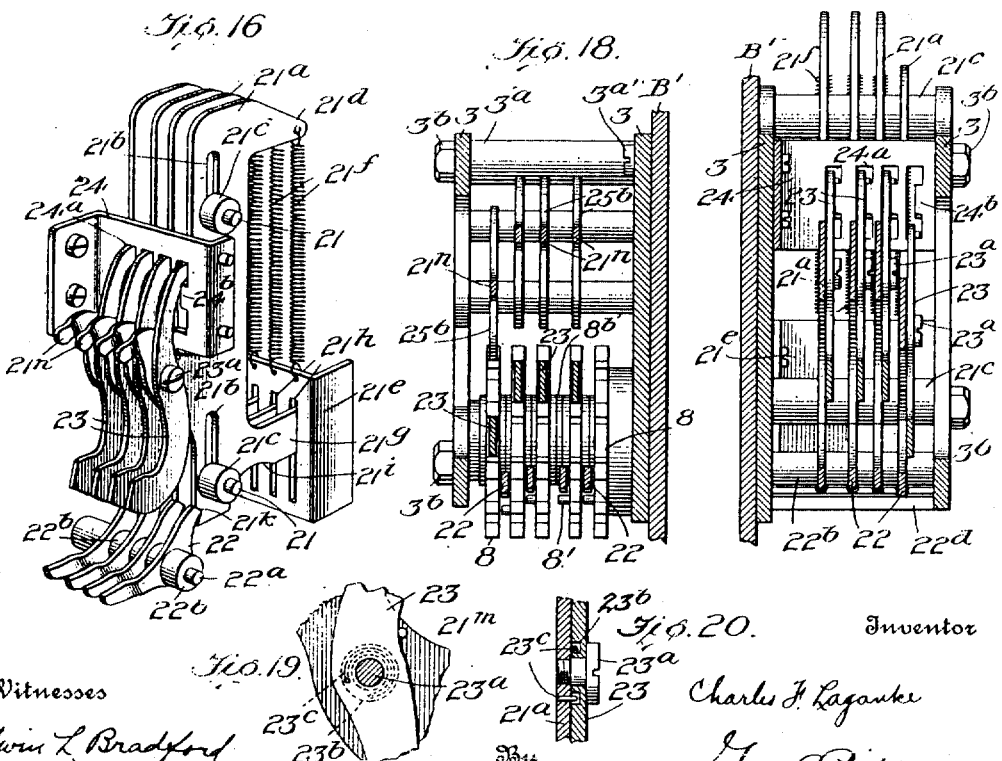
Witnesses
Edwin L. Bradford
C. D. Lord
Inventor
Charles F. Laganke
By Geo. P. Pitts
Attorney

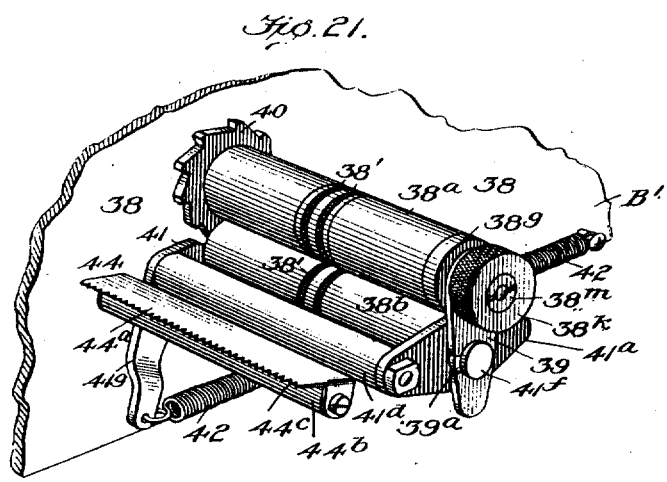
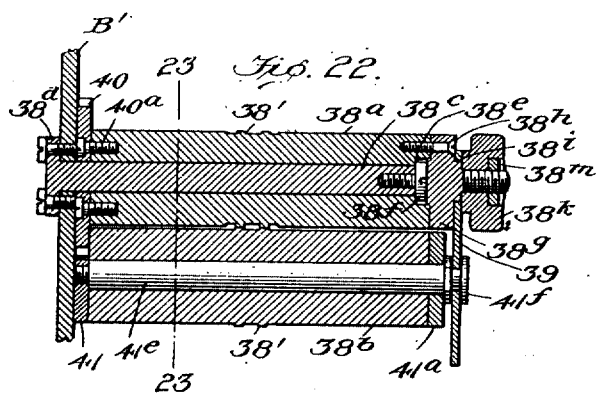
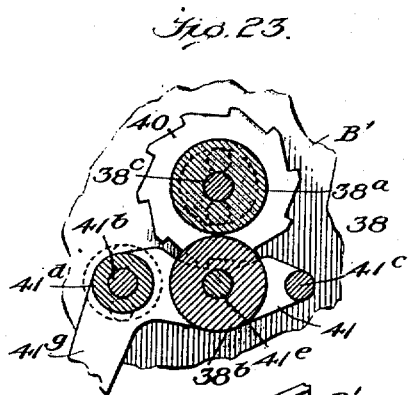
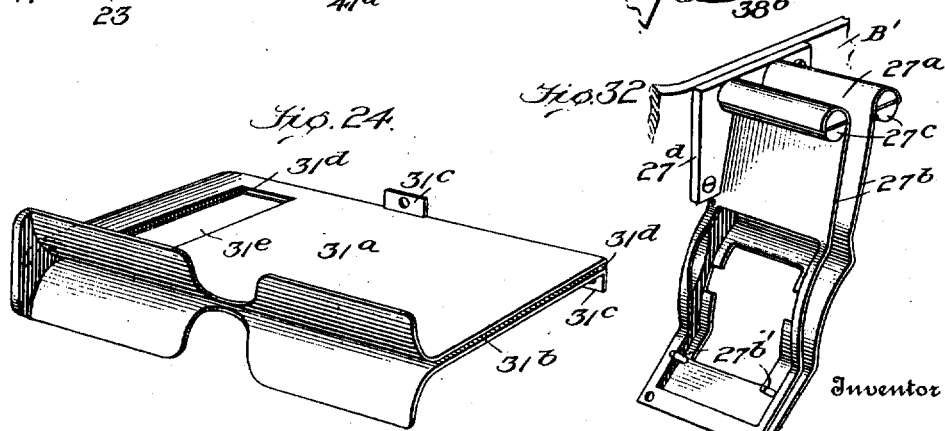

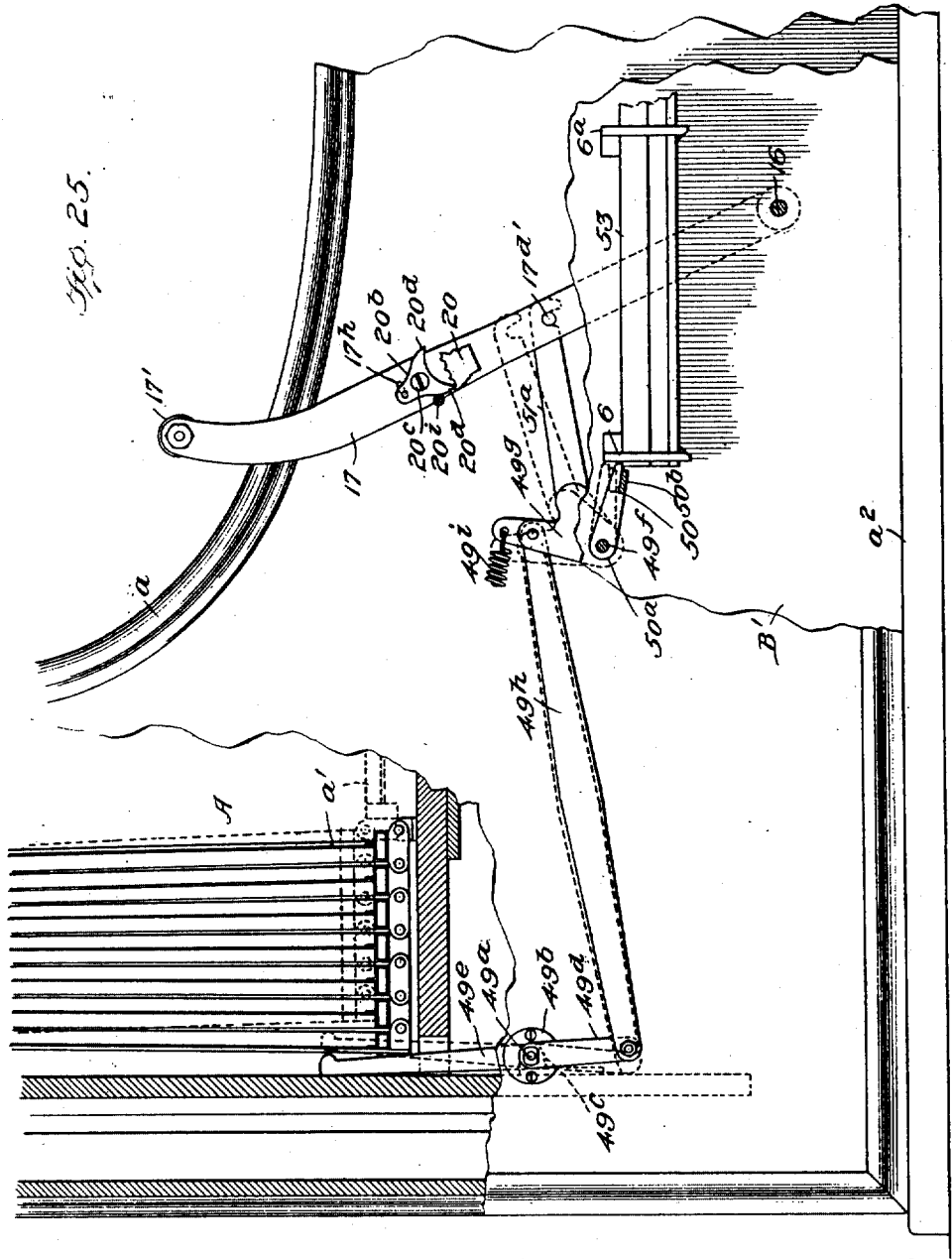

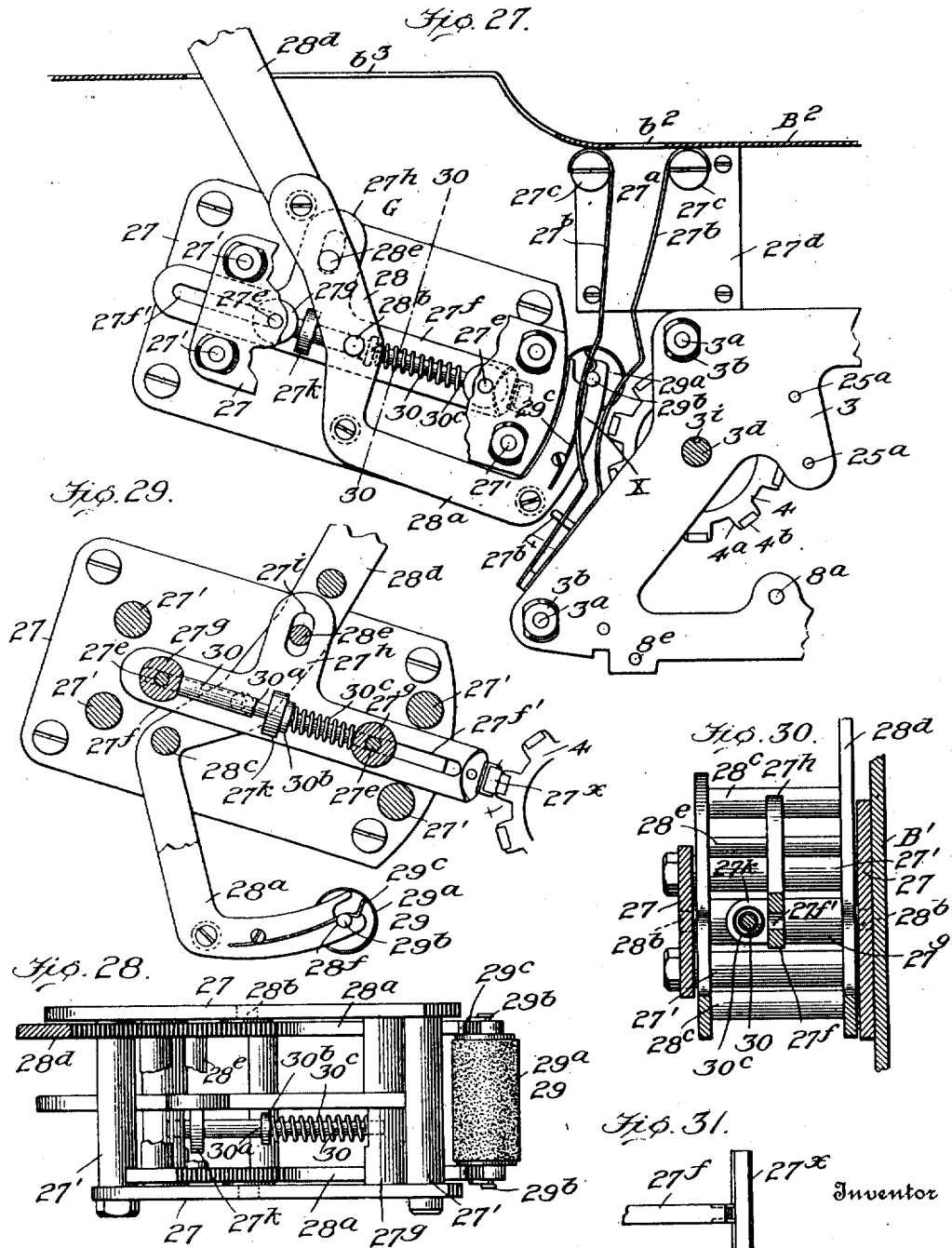

UNITED STATES PATENT OFFICE.

CHARLES F. LAGANKE, OF CLEVELAND, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

AUDITING AND FILING APPARATUS.

1,235,701.     Specification of Letters Patent.     Patented Aug. 7, 1917.

Application filed July 1, 1912. Serial No. 706,938.

*To all whom it may concern:*

Be it known that I, CHARLES F. LAGANKE, a citizen of the United States, residing at Cleveland, in the county of Cuyahoga and State of Ohio, have invented new and useful Improvements in Auditing and Filing Apparatus, of which the following is a specification.

This invention relates to combined filing and auditing apparatus for filing and storing papers, bills and like documents and for auditing and totaling amounts.

For the purpose of illustration, I have, in the accompanying drawings, shown and herein described one form of apparatus embodying my invention.

Fig. 7 is a transverse sectional view on the line 7—7 of Figs. 3 and 5.

Fig. 8 is a fragmentary side elevation, partly in section, of the transaction printing mechanism, the register-wheel operating bars, and the locating and releasing devices therefor.

Fig. 9 is a sectional view on the line 9—9 of Fig. 8.

Fig. 10 is a fragmentary detail perspective view of the restoring device for the register-wheel operating bars and its sliding carrier, and the paper web feeding mechanism.

Fig. 11 is a top plan view of the keys and key board showing the position of the keys after clerk No. 34 has set the keys to charge $958.76 against the customer whose account is numbered 567.

Fig. 12 is a top plan view of the forward portion of the operating bars when positioned for the above transaction.

Fig. 13 is a bottom plan view of the key board casing and operating bars in normal position showing the printing characters thereon.

Fig. 14 is a view similar to Fig. 13 with the bars in the position shown in Figs. 11 and 12.

Fig. 15 is a side elevation of the registering wheels, the driving gears therefor, and the transfer or carrying-forward mechanism.

Fig. 16 is a perspective view of parts of the transfer or carrying-forward mechanism.

Fig. 17 is a section on the line 17—17 of Fig. 15.

Fig. 18 is a section on the line 18—18 of Fig. 15.

Figs. 19 and 20 are detail views of the pivots for the thrust members of the transfer or carrying-forward mechanism.

Fig. 21 is a perspective view of the paper strip feeding rollers and the paper cutter.

Fig. 22 is a longitudinal sectional view of the paper strip feeding rollers.

Fig. 23 is a sectional view on the line 23—23 of Fig. 22.

Fig. 24 is a perspective view of the bill or slip-receiving and positioning plate.

Fig. 25 is a fragmentary side elevation of the apparatus showing in detail parts of the interlocking mechanism between the slip-holding frames and the auditing mechanism.

Fig. 26 is a plan view of parts of the interlocking mechanism for the operating bars.

Fig. 27 is a side elevation of the total printing mechanism in operative relation to the registering wheels.

Fig. 28 is a plan view of the printing mechanism.

Fig. 29 is a side view of the printing mechanism in operation, the supporting plate on the near side being removed.

Fig. 30 is a section on the line 30—30 of Fig. 27.

Fig. 31 is a detail view of the platen for the printing mechanism.

Fig. 32 is a perspective view of the bill or strip-positioning frame for the total printing mechanism.

Fig. 33 is a cross section of the main rock shaft and the release dog for the transaction printing mechanism.

Fig. 34 is a fragmentary view illustrating the construction of the dogs carried by each of the register wheel operating bars.

Figure 1:
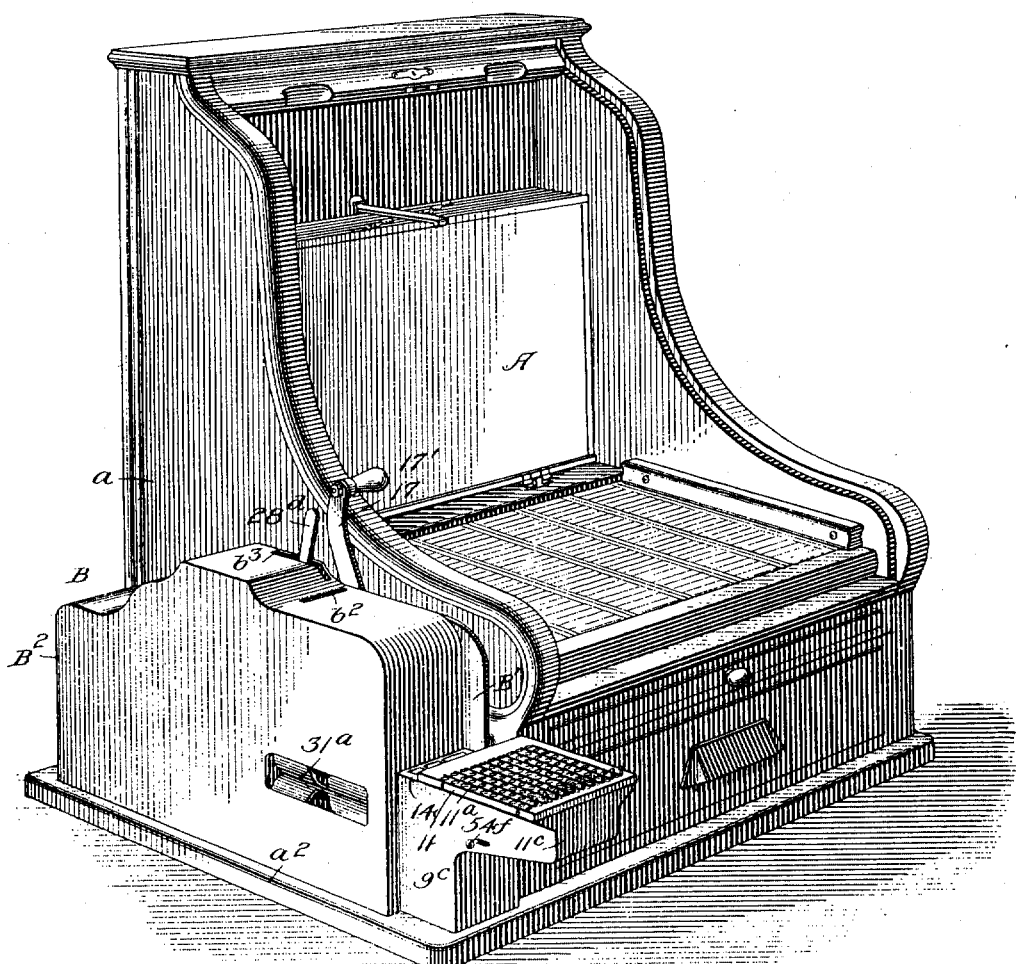
Figure 1 is a perspective view of a mechanism or apparatus embodying my invention.

In the drawings A indicates as an entirety a series of pivotally mounted holders or frames of any usual or preferred form of construction for receiving and detachably holding papers, paper slips or bills. The holders or frames are preferably detachably mounted in a suitable casing $a$ and adapted to swing relatively to each other from a substantially vertical position to a substantially horizontal position, and vice versa. The holders or frames and the pivotal supports therefor, selected for illustration herein, may in general construction, be similar to the holders and their supports shown and described in U. S. Patent No. 853,651, dated May 14, 1907, to Staples and Potter, and therefore further description thereof will not be necessary.

B indicates as an entirety the supporting frame-work for the auditing mechanism, preferably fixed to one side of the casing $a$, by one or more bolts 2. $2^a$ indicates a series of spacing members, each of which preferably comprises a sleeve, surrounding a bolt 2 to provide a space between the supporting frame-work B and the casing $a$. This construction provides a simple form of connection with the casing $a$ and also permits certain parts of the apparatus to be movably mounted on that face of the frame-work B adjacent to said casing, as will be later described. The bottom of the casing $a$ may be extended laterally, as shown at $a^2$, to assist in supporting the frame-work B and auditing mechanism. The frame-work B preferably includes a main frame $B^1$ and a case $B^2$ having side and end walls, which cover the mechanism and protect it from dust and damage.

C indicates as an entirety the registering or adding mechanism; D the means for operating the registering or adding mechanism; E the control means which throw into operation various parts of the apparatus and return the register operating mechanism and keys thereof to normal or zero position; F the transfer or carrying forward devices for the registering or adding mechanism; G the total printing mechanism; H the individual transaction printing mechanism; I the paper strip or web supply and feeding or advancing means; and J the register wheel resetting devices.

Of the registering mechanism C, 3, 3, indicate a pair of spaced supporting plates, which are normally mounted on the main frame $B^1$. $3^a$ indicates a series of bolts or rods preferably fixed at their inner ends to the inner supporting plate 3 and extending outwardly at right angles thereto. The free ends of these bolts extend through openings therefor formed in the outer plate 3, and are screw-threaded to receive nuts $3^b$. As shown at $3^c$, the opposite ends of these bolts are shouldered to form abutments against which the plates 3 are pressed when the nuts $3^b$ are tightened against the adjacent face of the outerplate 3. The shoulders of the bolts thus serve to space the plates apart parallel to each other. $3^{a\prime}$ indicates a series of screws extending through openings formed therefor in the inner plate 3 and adapted to suitable screw-threaded openings in the main frame B'. These screws operate to removably secure the inner plate 3 to the frame B'. The form of construction just described permits the outer plate 3 to be removed from the free ends of the bolts $3^a$ without detaching the inner plate from the frame B'; it also permits both plates, and the mechanism arranged between them, to be detached from the main frame B' as a unit. The outer plate 3 is preferably of skeleton form to expose the mechanism arranged between the plates and also to assist in decreasing the weight of the apparatus.

$3^d$ indicates a shaft that is mounted in suitable alined bearings formed in the supporting plates 3. Near its inner end this shaft is provided with an integral collar or annular rib $3^e$. $3^f$ indicates a retaining plate fixed to the inner plate 3 by screws $3^g$. This plate is formed with an opening, through which the shaft $3^d$ extends, and an annular recess or socket $3^h$ to receive the collar $3^e$. By this form of construction it will be seen that the bottom wall of the recess $3^h$ forms a bearing shoulder for the collar $3^e$ and serves to prevent endwise movement of the shaft $3^d$ as well as maintaining its inner end in the bearing therefor in the inner plate 3. $3^i$ indicates a groove or recess extending longitudinally of the shaft, the purpose of which will be later described. The shaft $3^d$ is normally stationary, but may be rotated to re-set the registering wheels, as hereinafter set forth.

4 indicates a series of registering or adding wheels arranged side by side and loosely mounted on the shaft $3^d$, whereby they may be rotated together or independently. The wheels 4 preferably rotate in an anti-clockwise direction (as viewed in Figs. 2, 5 and 15) to register or add. There is preferably one wheel 4 for each numeral or digit in a line of figures representing an amount which the machine may be called upon to register or add.

In the illustrated embodiment of my invention I have adapted the machine for registering or adding an amount which may consist of five figures or less, whereby amounts aggregating 99,999 can be registered or added. It will, however, be clearly understood that a greater or less number of register wheels 4 could be used to adapt the apparatus to any conditions required. As the invention is shown as applied to mercantile business and adapted for totaling and recording monetary amounts, the innermost registering or adding wheel 4 (or that wheel nearest the main frame B') may be termed the "cents" wheel, and the remaining wheels 4 from right to left (in Fig. 6) the "tens of cents" wheel, the "dollars" wheel, the "tens of dollars" wheel, and the "hundreds of dollars" wheel, respectively, said wheels being capable of adding or registering amounts aggregating $999.99.

The series or set of registering wheels 4 may be used for recording each sale and totaling all of said sales for any specified period—, for instance one day or one week; or they may be used for recording and totaling a particular class of sales, such as credit sales. In the latter event, an additional set of registering wheels can be used for recording and totaling cash sales and other sets may be added for particular purposes, as may be found necessary in any particular or desired application of the invention.

Each of the registering wheels comprises a disk-like structure provided with ten radially projecting members $4^a$ that carry the characters 1, 2, 3, 4, 5, 6, 7, 8, 9, 0, *seriatim*, on their respective faces $4^b$. Preferably each face is provided with a recess or depression $4^c$ in which a character is mounted in order that the walls of the recess may protect the character from damage.

The projecting members $4^a$ are preferably spaced from each other uniform distances in order that they may serve as gear teeth for rotating the wheels 4 on the shaft $3^d$.

$4^d$ indicates an annular recess preferably formed in one side of each register wheel 4. $4^e$ indicates a pawl pivotally mounted in each of said recesses $4^d$. $4^f$ indicates a light spring normally operating to press the nose or free end of the pawl $4^e$ toward or into engagement with the shaft $3^d$. The pawl $4^e$ rides on the shaft $3^d$ past the recess $3^i$ therein during the normal operation of the register wheels 4. However, as will be later described, when the shaft $3^d$ is rotated in an anti-clockwise direction (as viewed in Figs. 2 and 5) the front wall of the recess $3^i$ will engage the end of the pawls $4^e$ and thus rotate the register wheel or wheels. The object of this operation is to re-set all of the register wheels at zero. As there is only one recess $3^i$ in the shaft $3^d$ and each pawl $4^e$ is connected to an adjacent register wheel 4 at the same point with reference to its "0" character, it will be understood that when the shaft $3^d$ is rotated, the wall of the recess $3^i$, operating through the pawls $4^e$, will move the wheels 4 to the starting or zero position with their "0" characters opposite or alined with each other. In case the register wheels 4 are in different positions, angularly with reference to each other, the front wall of the recess $3^i$ will pick up each pawl $4^e$ successively until all are carried around by the shaft $3^d$. The shaft $3^d$ is then rotated far enough to bring the characters "0" to the zero point. The recess $4^d$ in each register wheel 4 permits the latter to be placed close together side by side on the shaft $3^d$.

5 indicates a spacing device which may be interposed between the "tens of cents" wheel and the "dollars" wheel on the shaft $3^d$ to slightly separate these wheels from each other. In printing the amounts to be added and the total amount registered or added, the space between these two wheels forms a convenient way of indicating to the eye the cents columns and the dollar columns, such space serving therefore as the equivalent of a decimal point. The spacing device 5 is preferably loose upon the shaft $3^d$.

Of the register operating means D, 6, $6^a$, indicate a pair of vertically arranged plates supported on and extending from the frame B' at right angles thereto. These plates are formed with a series of slots or guide openings $6^b$, the openings in the plate 6 alining with the openings in the plate $6^a$. The plates 6, $6^a$, may be secured to the main frame B' in any well known manner.

7 indicates a series of operating members, preferably comprising bars slidably mounted in the guide openings $6^b$, one of said bars being provided for each of the registering wheels 4 and preferably arranged in the same vertical plane therewith. These bars are preferably all of the same length and extend forward beyond the front end walls of the casing B. The bars 7 are normally arranged in their forward or zero position, as shown in Figs. 1, 2, 5 and 13, side by side, and are free to be moved in a positive direction, or toward the rear end of the frame B'. Preferably one wall of each guide opening $6^b$ is provided with an off-set $6^c$ which fits into a groove $7^a$ formed in and extending longitudinally along one side wall of the adjacent slide bar 7. The off-set $6^c$ and walls of the groove $7^a$ serve to maintain the bars in a horizontal position at all times.

70 indicates a groove recess formed in the upper edge or surface of each bar 7. $7^c$ indicates a series of dogs or teeth pivotally mounted at their front ends on transverse shafts or pins $7^d$ in the recess $7^b$. Each of said dogs $7^c$ is formed with a cut-away portion in its rear wall to form upper and lower rearward projecting arms $7^e$ which engage a stop pin $7^f$ extending across the path of movement of said arms $7^e$. The upper arm 7ᵉ engaging said pin limits the downward movement of the dog 7ᶜ and the lower arm 7ᵉ engaging the pin limits the upward movement of the dog. 7ᵍ indicates a series of springs, one for each dog 7ᶜ, normally pressing the dogs upwardly, but permitting them to be pressed downwardly substantially flush with the upper surface of the bars 7 for a purpose to be presently described.

8 indicates a series of gears freely mounted on a transverse shaft 8ᵃ and meshing with the teeth or members 4ᵃ of the register wheels 4. This shaft 8ᵃ is arranged parallel to the shaft 3ᵈ and is preferably mounted in the side plates 3. The gears 8 are preferably separated from each other by washers 8ᵇ so that one will not tend to rotate an adjoining gear by frictional contact. There is one gear 8 for each register wheel 4, and said gear is arranged so that its teeth lie in the path of movement of the dogs or rack teeth 7ᶜ of an adjacent slide bar 7. By this construction it will be understood that when a slide bar 7 moves rearwardly, its dogs 7ᶜ will engage the teeth of the adjacent gear 8 and rotate it, which in turn will rotate the adjacent registering wheel 4. In the return or forward movement of the bar 7, the dogs 7ᶜ ride the teeth of the gear 8, that is, the teeth will press the dogs downwardly against the tension of the spring 7ᵍ, and permit them to pass the gear 8 without rotating it.

8ᶜ indicates a series of locating devices that engage the gears 8 and serve as yielding stops, causing them to always assume definite positions when coming to a state of rest, and also preventing accidental rotation of the gears 8. There is a locating device 8ᶜ for each of the gears 8. Each of these devices preferably comprises an arm 8ᵈ freely pivoted upon a stationary shaft 8ᵉ carried by the frame work B′ or plates 3, a disk or roller 8ᶠ, which engages the opposing walls of adjoining teeth of an adjacent gear 8, and a spring 8ᵍ which operates to yieldingly maintain the roller against the adjacent gear. The effect of this construction is to stop the gears at definite positions, prevent their accidental rotation from one position to another, either due to momentum imparted to them when operated, or other causes, and also to prevent backward movement of the gears 8, especially during the return of the bars 7. As will be understood, the locating devices 8ᶜ, through their engagement with the gears 8, also serve indirectly to prevent rotation of the register wheels 4, except during their normal positive operation, as well as to stop them at definite positions with their numerical characters in alinement with each other at the end of each operation.

9 indicates a series of devices, one for each slide rack 7, which serve as locating, and lock and release means therefor. Each of these devices preferably comprises a lever 9ᵃ pivoted on a transverse shaft 9ᵇ arranged below the bars 7, the opposite ends of the shaft being mounted in a pair of auxiliary side plates 9ᶜ. The plates 9ᶜ are preferably removably mounted on the frame B′ and relatively to each other similar to the side plates 3. One arm 9ᵈ of each lever 9ᵃ extends upwardly and slightly rearwardly of its pivot into engagement with notches 7ʰ, formed in the lower edge of the adjacent bar 7. Each arm 9ᵈ is preferably provided with an anti-friction roller 9ᵉ.

The other arm, 9ᶠ, of each lever 9ᵃ depends downwardly and rearwardly and is preferably substantially arc-shaped. Intermediate of its length, each arm 9ᶠ is provided with a cam 9ᵍ, the purpose of which will be later described.

9ʰ indicates a forward extension carried by each lever 9ᵃ and preferably formed integral therewith. To the free end of each extension is attached one end of a tension spring 9ⁱ, the opposite end of said spring being attached to a fixed transverse rod 9ᵏ. These springs operate to maintain the arms 9ᵈ in yielding engagement with the walls of the notches 7ʰ. As will be seen, each bar locating arm 9ᵈ serves to locate or stop the adjacent bar 7 at predetermined positions, and by reason of the arrangement of the arm relative to its pivot, it also operates to stop the bar 7 against rearward or retrograde movement. I preferably provide each bar 7 with a sufficient number of dogs 7ᶜ and notches 7ʰ, so that when a forward or positive movement is imparted to a bar 7 it will rotate the adjacent register wheel 4 from one to nine points, which latter, as will be readily understood, will be the highest number any one wheel can register at a single operation.

Figure 4:
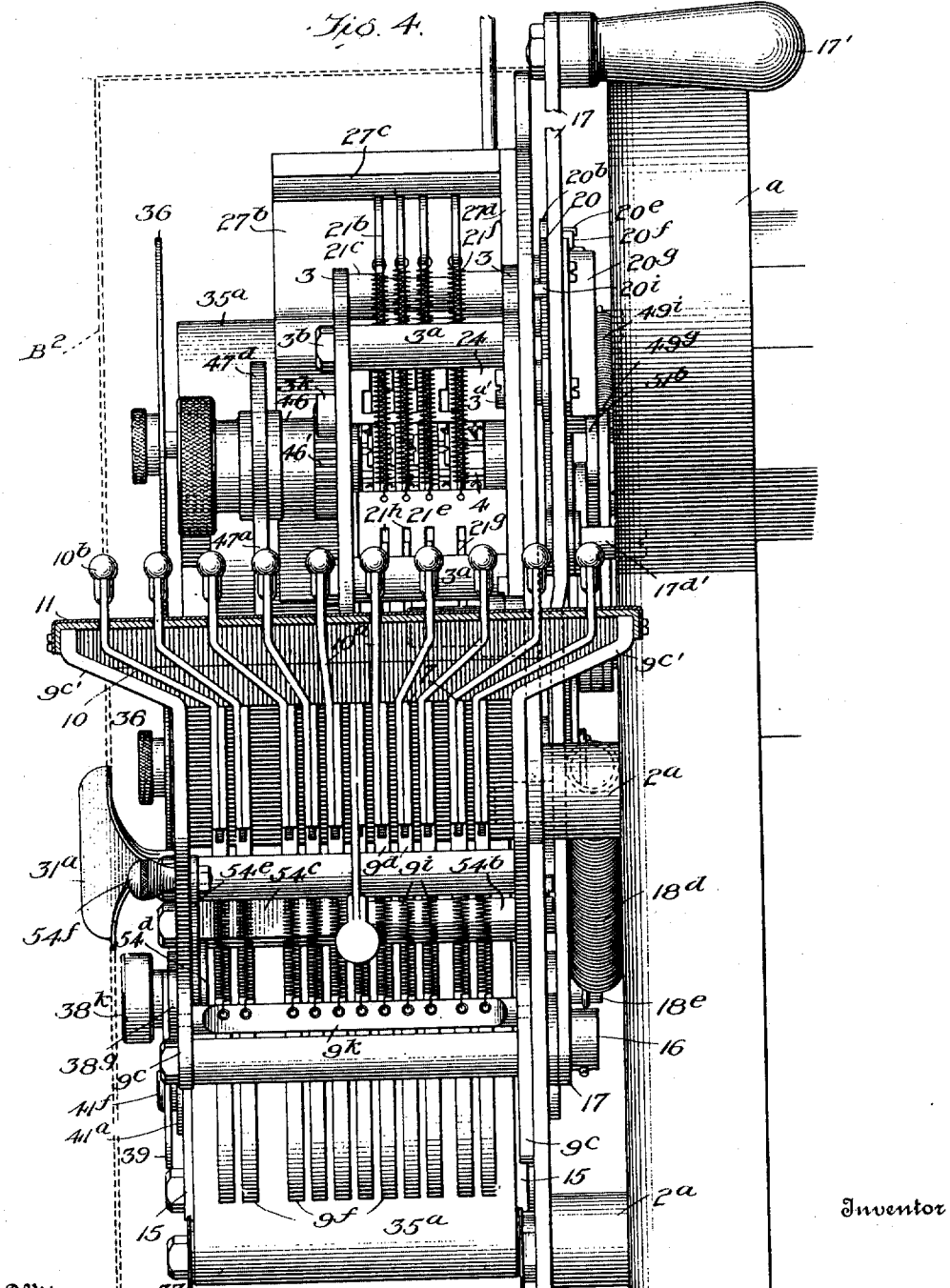
Fig. 4 is a front elevation of the auditing mechanism, the front walls of its casing being omitted and the side and top walls thereof being shown in dotted lines.

10 indicates the keys for operating the slide bars 7. Each of the keys comprises a standard 10ᵃ fixed to the forward end of an adjacent bar 7 and carries at its upper end a head or finger piece 10ᵇ by means of which it can be grasped and conveniently operated. The standards 10ᵃ are preferably bent intermediate their ends at varying angles, relative to each other, as clearly shown in Fig. 4, in order that their finger pieces 10ᵇ can be uniformly separated from each other a sufficient distance to permit the operation of the keys independently.

11 indicates a key board for the auditing or registering mechanism. It comprises a plate formed with a series of parallel slots 11ᵃ, one for each key, extending in a longitudinal direction. The key board plate 11 is mounted on the upper edges of the auxiliary side plates 9ᶜ, these plates having upwardly extending diverging walls 9ᶜ′ which support the plate 11 in a horizontal plane slightly above the slide bars 7. As will be understood from the drawings, the keys 10 project through the slots 11ª, so that their finger pieces are above the key board 11.

The slots 11ª are of a length to permit the complete stroke of each bar 7. Preferably, their opposite end walls serve as stops to limit their movement in the positive or forward direction, and in the negative or rearward direction back to "zero" position. The characters "0" to "9" may be mounted at one side of each key guide slot. Said characters are arranged in rows one behind the other in ascending series from the front end of the adjacent slot to its rear end, being separated from each other a distance equal to the distance between adjoining notches 7ʰ in the bars 7. These characters serve as visual guide or signal devices to determine the length of stroke required to slide a bar to effect the registering of a particular number. Preferably, one side wall of each slot 11ª is notched to form abutments, one abutment being opposite each character, as shown at 11ᵇ. These abutments serve as stops for the keys 10 when moved to a point opposite any numeral. In the construction of the apparatus very slight play may be provided between the bars 7 and their guides 6ᵇ, which play will permit the keys 10 to be pressed laterally into sliding engagement with either side wall of the slots 11ª. Hence, with a little practice the operative may learn to press the keys near the end of their strokes toward the notched wall and eventually bring them into engagement with the abutment 11ᵇ opposite the desired character. This construction facilitates the operation of the keys 10 and produces accuracy as well as rapidity of operation. As shown at 11ᶜ suitable closing plates forming side and front walls for the front ends of the slide bars may be provided, the front wall plate extending inwardly from the front edge of the keyboard 11, and downwardly to cover the entire front end of the mechanism.

12 indicates a plate arranged behind the keyboard and stationarily mounted on the upper edges of the auxiliary side plates 9ᶜ. As shown in the drawings, this plate is superposed immediately above the slide bars 7. It is formed with a sight opening or openings 12ª which extend transversely across the upper edges of the bars 7 and form what may be termed a "reading line". As shown at 13 (Figs. 11 and 12), the upper edge of each bar 7 is provided with the characters "0" to "9", seriatim, one behind the other, but in reverse order to the arrangement of said characters on the keyboard 11. The characters on one bar are arranged opposite similar characters on an adjoining bar. The characters 13 are arranged on the bars at such position relative to the opening 12ª that when the bars are at "zero", the characters "0" carried thereby will be exposed at the reading line through said sight openings 12ª. As the slide bars 7 are moved in the positive direction, the characters 13 thereon will be exposed successively through said openings. These openings 12ª thus provide convenient means for displaying to the eyes of the operative the number at the end of one operation set up to be registered or accumulated. If desired, the operative may watch the figures 13 move below the opening 12ª until the figures he desires to register appear and thereby determine the length of movement of the bars 7. In such case the operative will not watch the characters on the keyboard, but will determine the throw of the bars 7 by the characters 13.

14 indicates a name plate arranged adjacent to the reading line sight openings 12ª. It may be formed with one or more openings in which may be arranged a name card or cards designating the nature of the subject matter to which the figures or characters exposed to view relate, the words "Amount charged" being displayed in one of the openings (see Fig. 11).

Of the control means E, 15 indicates a pair of supporting plates preferably of substantially rectangular shape. These plates are, by preference, removably fixed to the main frame B′ and also supported relatively to each other in a manner similar to that shown and already described in connection with the plates 3. The plates 15 are arranged below the slide bars 7 and are formed with alined openings which provide bearings for a stud shaft 16.

As will be understood from Figs. 3, 4, 8 and 25, the shaft 16 extends through the main frame B′ and has fixed to its inner end an operator or arm 17. At its upper end, the arm 17 is provided with a handle 17′ whereby it can be conveniently operated forwardly and rearwardly (see dotted lines in Fig. 3) to rock the shaft 16. This operator is preferably mounted on that side of the apparatus adjacent to the casing $a$ in order that the operative can conveniently manipulate a credit slip or bill with his left hand during the printing operation, as will be later described.

Figure 3:
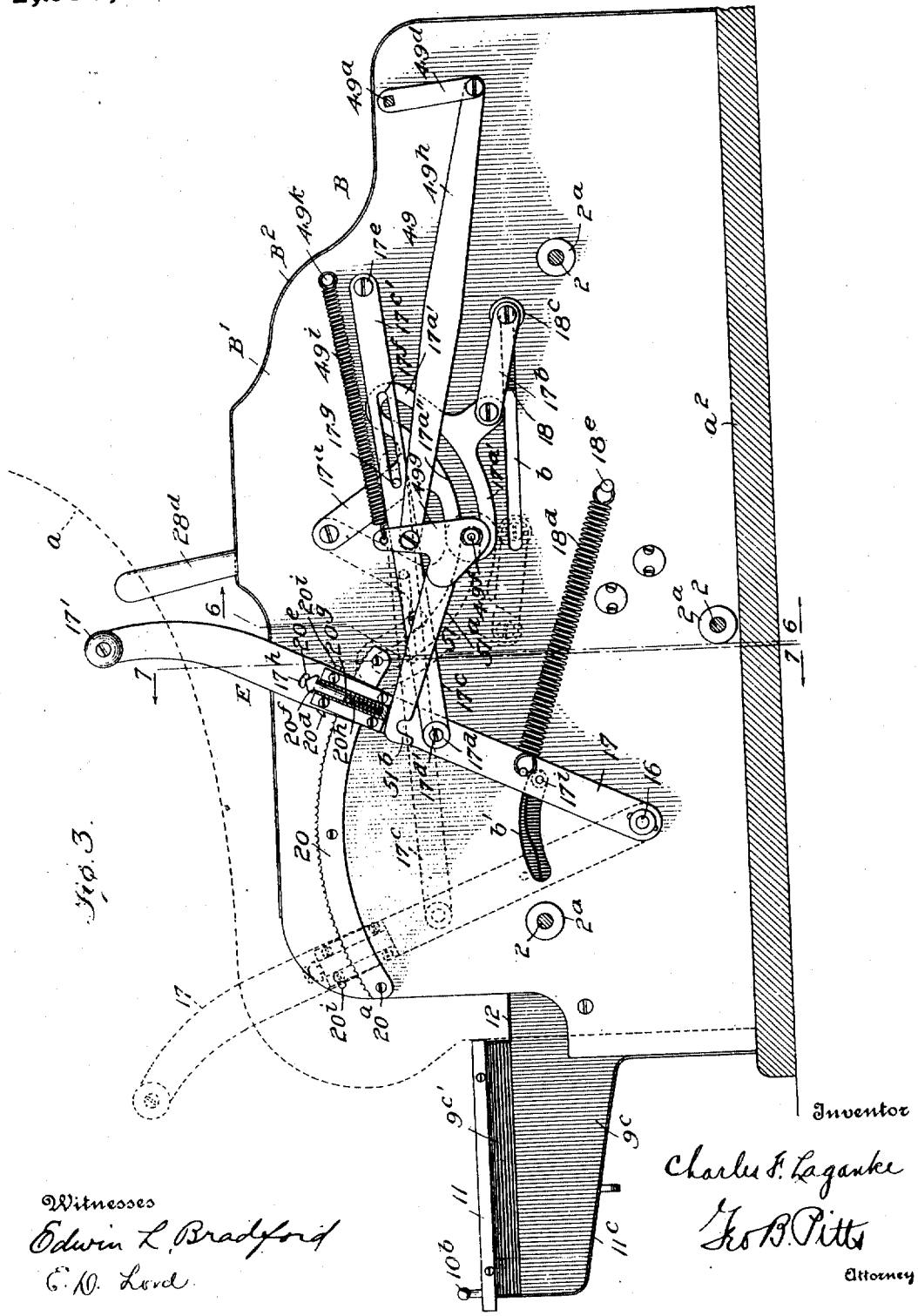
Fig. 3 is a side elevation of the mechanism from the side opposite to that shown in Fig. 2, the cabinet for the filing frames being shown in dotted lines.

17ª indicates a link pivoted at one end to the frame B′ and arranged to swing as shown in dotted lines in Fig. 3. At its opposite end the link 17ª is pivoted to the front end of a second link 17ᵇ. This latter link is pivotally connected at its rear end to a reciprocating pusher or bar return-member 18.

17ᶜ indicates a connecting device between the operator 17 and swinging link 17ª for moving the latter forwardly and rearwardly. This device preferably comprises a pair of plates or bars 17ᶜ′, 17ᶜ′, arranged on opposite sides of the link 17ª. The bars are pivotally connected at 17ᵈ to the opposite sides of the operator 17, and also connected together, with a spacing washer between them, at their free or rear ends by a screw or bolt 17° in a well known manner.

17ᶠ indicates alined elongated slots (only one of said slots being shown) formed in the bars 17ᶜ and arranged to receive pins or studs 17ᵍ projecting laterally from opposite sides of the link 17ᵃ. As these pins 17ᵍ lie in the path of movement of the end walls of the slots 17ᶠ formed in the bars 17ᶜ, when the latter are moved in one direction or the other, one of said end walls will engage the pins 17ᵍ and swing the link 17ᵃ about its pivot, which link in turn, operating through the link 17ᵇ, will operate the pusher 18. As will be understood, the slots 17ᶠ permit the operating arm 17 to move a predetermined distance in either direction without imparting movement to the links 17ᵃ and 17ᵇ, and the pusher or bar restoring device 18.

b indicates an elongated slot formed in the main frame B' and extending in a horizontal direction rearwardly from the rear ends of the slide bars 7. This slot forms an opening through which the stud or pivot between the link 17ᵇ and pusher 18 extends and moves. 18ᵃ indicates guides fixed to the frame B' to guide the slide bar return member 18 forwardly and backwardly. These guides may consist of two spaced plates arranged on opposite sides of the slot b and provided with flanges 18ᵇ which fit the upper and lower rabbeted edges of the pusher 18, thereby slidably supporting the pusher on the frame B'. A washer 18ᶜ may be interposed between the link 17ᵇ and adjacent face of the frame to prevent binding as the pusher moves from end to end of the slot b.

18ᵈ indicates a spring, preferably of the coiled type, for holding the operator or arm 17 in its rearmost position (see Figs. 1, 2 and 3), one end of the spring being fixed to a stud or hook 18ᵉ on the frame B' and its opposite end being connected to the arm 17. The spring is put under tension when the arm 17 is moved forwardly and is preferably of sufficient strength to return the arm to its first position.

The pusher 18 is arranged normally at the rear end of the slot b and is movable forwardly by the link mechanism and the operator 17. The pusher 18 may comprise a carrier-plate 18ᶠ and a bracket or arm 18ᵍ, the base of which is fixed to the carrier plate, arranged in a horizontal plane co-incident with the slide bars 7, whereby said arm will engage the rear ends of those slide bars, which are operated, and push them back to "zero" position. 18ʰ indicates a rod or plate for bracing the free end of the bracket 18ᵍ. 18ⁱ indicates a depending arm preferably formed integral with base of the bracket 18ᵍ. The lower end of this arm is bent inwardly and is preferably bifurcated, as shown at 18ᵏ, to provide supports for a pivoted pawl 18ʲ.

19 indicates a device for moving the locating and locking means out of engagement with the slide bars 7, whereby the latter can be returned to normal position. This device preferably comprises a swingable frame fixed to and operated by the rock shaft 16. This frame may consist of a pair of arms 19ᵃ fixed at their inner ends to the shaft 16 and connected together by one or more tie rods 19ᵈ. 19ᵇ indicates an antifriction roller loosely mounted between the free ends of the arms 19ᵃ and arranged to engage with and ride the cam 9ᵍ. The inner end of each arm 19ᵃ may be formed with an opening to receive a set screw 19' adapted to connect it to the shaft 16. The normal position of the frame 19 is shown in Fig. 8. Its free end swings downwardly when the operator 17 is moved forwardly. During such movement, the roller 19ᵇ engages the cam 9ᵍ and swings the lever arms 9ᶠ forwardly, thus releasing or disengaging the arms 9ᵈ from the notches 7ʰ of the slide bars 7. Following the release of the bars 7, the pusher 18 engages the rear ends of those bars which have been operated and returns them to normal position, it being understood, of course, that the arrangement of the link mechanism between the operator 17 and pusher 18 is such that the engagement of the end walls of the slots 17ᶠ with the pins 17ᵍ to operate the pusher, does not occur until after the release of the slide bars 7.

As shown in the drawings, those portions of the depending lever arms 9ᶠ below the cams 9ᵍ are elevated, with reference to those portions thereof above the cams, so that during the continued downward movement of the frame 19, the locking arms of the levers will be maintained out of engagement with the slide bars 7 until the latter have been returned to normal position.

I preferably provide the apparatus with means which compel a full stroke of the operator 17. Of these means 20 indicates a curved rack fixed, as by suitable screws or bolts 20ᵃ, to the inner face of the frame B'. 20ᵇ indicates a plate pivoted at 20ᶜ to one face of the arm 17, and provided with two dogs or pawls 20ᵈ which project from opposite side edges thereof. Extending laterally from said plate is a pin 20ᵉ which projects through a curved slot 17ʰ formed in the operator 17. The fulcrum for the plate 20ᵇ is so arranged that when the pin 20ᵉ is at one end of the slot 17ʰ one dog will engage the rack, and when the pin is at the opposite end of said slot, the other dog will engage the rack. 20ᶠ indicates a plunger or thrust device, slidably mounted in a casing 20ᵍ which is carried by the said operator 17, as shown in Fig. 3. 20ʰ indicates a spring mounted in the casing 20ᵍ and engaging the inner end of the plunger 20ᶠ and serving to force the latter upwardly. The free end or head of the plunger is preferably V-shaped to form to oppositely inclined walls that engage the pin 20ᵉ to maintain it at either end of the slot 17ʰ. 20ⁱ indicates fixed stops carried by the plate B' and arranged at or near the end of the movement of the operator 17. These stops are arranged in the path of movement of the plate 20ᵇ and operate to automatically swing it on its pivot over the plunger head. Assuming that the operator is in the position shown in Fig. 3, it will be seen that the dog 20ᵈ projecting from the front side thereof is out of engagement with the curved rack, and that the dog 20ᵈ projecting from the rear side of the operator is in engagement therewith. The operator 17 is now free to move forwardly, but cannot be moved rearwardly by reason of the engagement of the rear dog 20ᵈ with the rack 20. When the operator 17 reaches the end of its forward movement, the front dog 20ᵈ of the pivoted plate 20ᵇ strikes the front stop 20ⁱ, and swings the plate on its pivot. This operation throws out the rear dog 20ᵈ and simultaneously throws the front dog 20ᵈ into engagement with the rack 20. The operator 17 may now be moved rearwardly, but in case attempt is made to move it forwardly, it will be prevented by the front dog 20ᵈ. When the operator 17 reaches its first or normal position, the rear stop 20ⁱ is engaged by the rear dog 20ᵈ, such engagement operating to swing the plate back to its former position, thus throwing out the front dog 20ᵈ and throwing in the rear dog 20ᵈ. It will thus be seen that the operator must always be moved a full or complete stroke in one direction before it can be moved in the opposite direction.

Of the transfer or carrying forward mechanism F, 21, 21, indicate a pair of transverse guide rods vertically arranged with reference to each other and mounted at their opposite ends in the plates 3, 3. 21ᵃ indicates a series of slide plates each provided with a pair of alined elongated apertures 21ᵇ through which the guide rods 21 extend. The walls of said slots serve to guide the plates upwardly and downwardly and the end walls thereof serve to limit the movement of the plates 21ᵃ in either direction.

As shown in the drawings, there is one carrying-forward mechanism for each register wheel, except the "cents" wheel, one plate 21ᵃ operating as the control member therefor. The slide plates are arranged side by side on the rods 21, but are preferably spaced from each other by sleeve members or washers 21ᶜ, which permit them to move independently. 21ᵈ indicates an arm extending forwardly from each plate 21ᵃ. This arm is preferably formed integral with the upper end of the plate. 21ᵉ indicates a bracket or angle plate mounted on or extending between the plates 3 and operating as a fixed support for one end of a series of springs 21ᶠ, one of which is provided for each slide plate 21ᵃ. The opposite end of each spring 21ᶠ is connected to the forwardly extending arm 21ᵈ of the adjacent plate 21ᵃ and operates to normally draw or pull said plate downwardly. The construction and arrangement of the springs 21ᶠ permit them to act on the plates 21ᵃ in a direction parallel to their direction of movement. 21ᵍ indicates an arm extending forwardly from the lower portion or end of each slide plate 21ᵃ and preferably formed integral therewith. These arms project into and slide longitudinally of slots 21ʰ, one for each arm, formed in the wall of the bracket 21ᵉ. The walls of the slots 21ʰ serve as guides for the arms and prevent lateral movements of the plates 21ᵃ as the latter move up and down. The lower edge of each plate 21ᵃ or arm 21ᵍ is formed with a recess 21ⁱ, the purpose of which will be presently described.

22 indicates a series of triggers, one for each plate 21ᵃ, loosely pivoted on a rod or shaft 22ᵃ and separated from each other by suitable washers 22ᵇ to aline said triggers with the adjacent plates 21ᵃ. The opposite ends 7 of the shaft 22ᵃ may be mounted in the plates 3. 21ᵏ indicates a shoulder or tooth provided on the rear edge of each of the plates 21ᵃ, with which shoulder one arm of the adjacent trigger engages to support the plate in an elevated position, the spring 21ᶠ therefor being under tension when the plate 21ᵃ is elevated. The other arm of the trigger 22 is bent intermediate its length (see Fig. 16), so as to extend between adjoining gears 8 and in the path of movement of a pin or projection 8' extending laterally from one side of each of said gears, (the gear to the right of each arm as viewed in Fig. 6). Each of the pins 8' is arranged at such point on the adjacent gear 8 that when the character "0" on the adjacent register wheel 4 passes the registering position (indicated at X), the pin 8' will engage with and trip the arm of the trigger 22 and automatically release it from the shoulder 21ᵏ of the adjacent slide plate 21ᵃ. Upon its release, the transfer slide plate 21ᵃ will move downwardly with a quick action under the influence of the connecting spring 21ᶠ and, through the mechanism about to be described, will rotate the next adjoining gear 8 to the left a distance of one tooth, thus rotating the adjacent register wheel 4 one point to carry forward the "1" to the next column in the accumulating total.

Suitable springs, indicated at 22ᶜ, may be interposed between each trigger 22 and an abutment 22ᵈ for yieldingly holding the triggers in locking position whereby they may operate automatically to engage the shoulders $21^k$ when the slide plates $21^a$ are raised.

$21^m$ indicates a rearwardly extending arm carried by or formed integral with each transfer slide plate $21^a$. Each of these arms preferably tapers toward its free end where it is enlarged to form a disk-like head $21^n$. Each arm $21^m$ is bent laterally or off-set (see Fig. 16) in order to arrange the head $21^m$ in a vertical plane with the adjacent gear 8.

Figure 5:
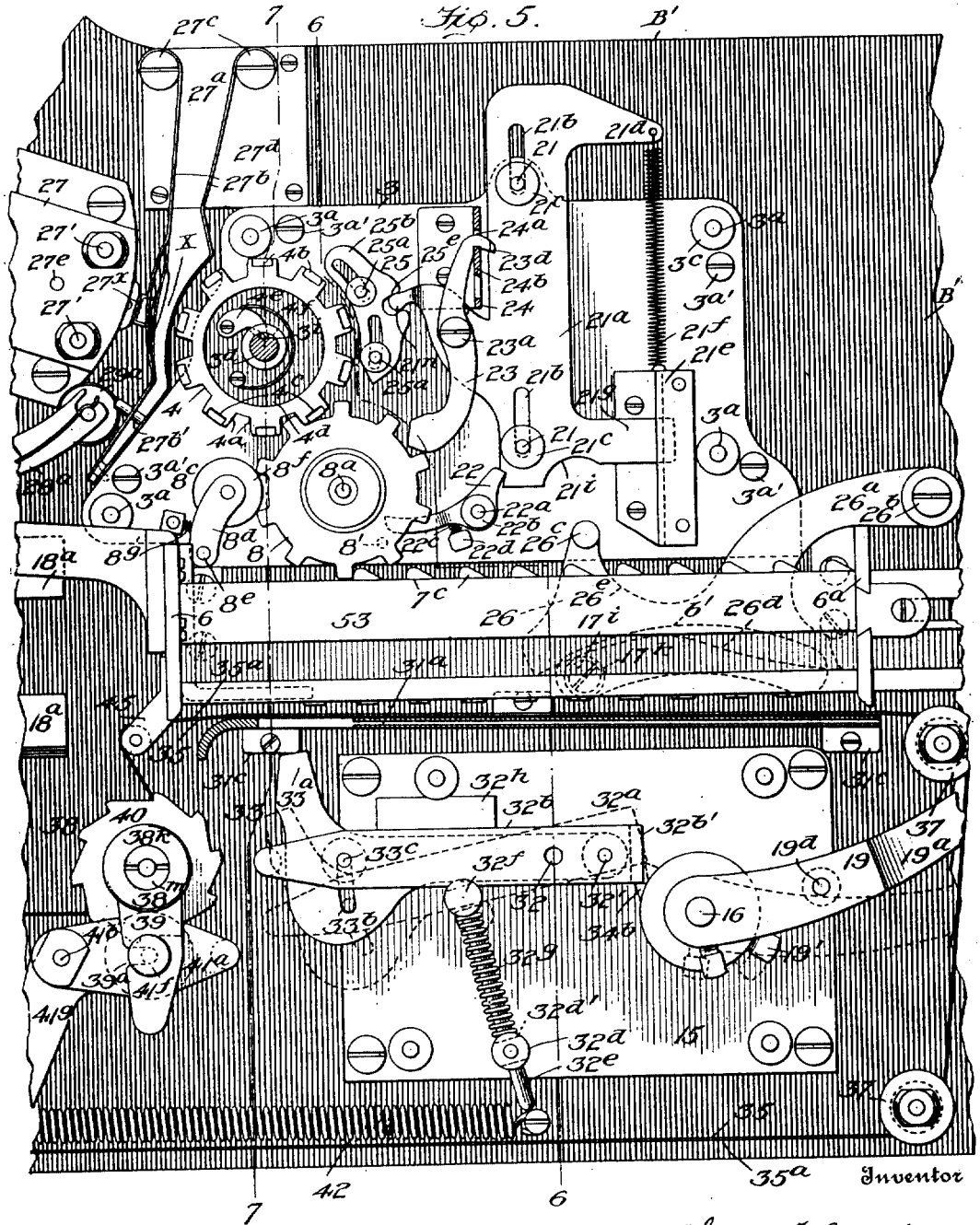
Fig. 5 is a fragmentary side elevation showing the registering or totaling wheels, the transfer or carrying-forward mechanism, the transaction-printing mechanism, and parts of the total printing mechanism.

23 indicates a plunger device, preferably comprising a rocking member pivoted intermediate its ends at $23^a$ upon each of the arms $21^m$. The lower end or depending arm of each plunger device or rocker 23 is bent or curved rearwardly as shown in Figs. 5, 15 and 16, and arranged above and in the plane of the adjacent gear 8, so that when the adjacent slide plate $21^a$ moves downwardly, the plunger 23 will engage a tooth of the gear 8 and move it one point, which gear will in turn rotate the register wheel in mesh therewith one point, or to the next number.

Each plunger 23 may be formed with an annular recess $23^b$ (see Fig. 20), surrounding its pivot opening, to receive a light spring $23^c$. One end of this spring is fixed in an opening formed in the arm $21^m$, while its opposite end engages the plunger 23 (see Fig. 19), and tends to swing its depending arm rearwardly.

24 indicates a comb plate supported by and extending at right angles to the inner plate 3. This plate is formed with a series of vertically extending slots or openings $24^a$ through each of which the upper end of an adjacent plunger 23 (which is bent or curved forwardly as shown in Figs. 5 and 15) extends and moves. At its free end the forwardly curved arm of each plunger 23 is provided with a lug $23^d$. $24^b$ indicates a guide and lock plate preferably formed integral with and extending inwardly from one side wall of each slot $24^a$. As will be understood from the drawings, this guide plate extends inwardly far enough so as to lie in the same vertical plane as the lug $23^d$, but leaves sufficient space for the upper arm of the plunger 23 to move from end to end of the slot $24^a$. In the normal position of the plunger 23, the lug $23^d$ is forward of the guide plate $24^b$, and remains in that position as the plunger moves downwardly. It follows from this that should a force act on the plunger to swing its lower end forwardly during downward movement thereof, the lug $23^d$ would engage the front face of the plate $24^b$ and prevent such movement, thus insuring a positive contact with and operation of the adjacent gear 8.

As the slide plate $21^a$ moves upwardly, the lower end of the plunger 23 swings forwardly, in freeing itself from the gear 8, and the lug $23^d$, carried by its upper end, moves rearwardly through the slot $24^a$ below the guide plate $24^b$ to a position rearward thereof. Thus, during the upward or return movement of the plunger its lower end is moved to and maintained in the forward position. After the lug passes the upper edge of the guide plate $24^b$, it swings through the slot $24^a$ and permits the plunger to assume its normal position. From this construction it will be seen that the plunger 23 is guided and maintained in operative position when moving downwardly, and is also guided and maintained in inoperative position when moving in the opposite direction, so that in the return movement of the plunger there will be no tendency to rotate the adjacent gear 8.

25 indicates mechanism for arresting the gears 8 after operation by the transfer or carrying forward mechanism. This mechanism coöperates with the transfer mechanism F to regulate the rotation of a gear one point each time the transfer mechanism is actuated. Of this mechanism, $25^a$ indicates a pair of spaced rods preferably supported at their opposite ends in the plates 3. $25^b$ indicates a series of plates, one for each slide plate $21^a$, and each arranged in the plane of a gear 8. The plates $25^b$ are formed with elongated openings $25^c$ through which the rods $25^a$ extend. The walls of the slots or openings, engaging the rods, support the plates thereon and permit them to move up and down on the rods, the plates being limited in their up and down movements by the end walls of the openings. The rods $25^a$ are preferably arranged relatively to each other and the slots $25^c$ curved so that the plates move through an arc struck from the axis of the register wheels 4. The plates may be suitably spaced from each other on the rods $25^a$ in order to maintain them in alinement with the gears 8. At its lower end, each plate $25^b$ is provided with an abutment $25^d$ which operates to arrest an adjacent gear. As will be understood from Fig. 15, when a plate $25^b$ is in its down position, the abutment $25^d$ lies in the path of movement of and is engaged by a tooth of the adjacent gear, whereby the latter will be arrested. At $25^e$ each plate $25^b$ is formed with a socket into which the head $21^n$ of the adjacent arm $21^m$ projects and rotatably fits. The socket $25^e$ and head $21^n$ form a connection between each arm $21^m$ and the adjacent plate $25^b$, whereby the latter will be moved up and down by the former. Each of the plates $25^b$ is so arranged relative to the adjacent plunger 23 that the former will not operate to arrest a gear until such gear has been rotated one point by the adjacent plunger; also the rods 25ᵃ are arranged to support the arresting plates so that the teeth of the gears 8 strike them in a direction substantially at right angles to the direction in which they move. By this arrangement and operation the plates serve as rigid abutments to arrest the gears 8.

Fig. 5 shows the transfer mechanisms in normal position, that is, the slide plates 21ᵃ, the gear actuating plungers 23 and arresting plates 25 in elevated position, the plates 21ᵃ being locked in such position by the trip levers 22, and the gears 4 at the starting or zero position. It will also be noticed that the trip pins 8' of the gears 8, are arranged immediately forward of the trip arms of the levers 22, so that if one or more of the gears should be rotated ten points, (which is one complete revolution thereof), the pin or pins thereof will trip the levers and thus carry forward or transfer the "1-to-carry" to the next gear, causing the latter to rotate one point. Referring to Fig. 15, the register wheels and the transfer mechanism and its associated parts corresponding to the "tens of dollars" register wheel are shown after the adjacent gear 8 has been actuated more than one complete revolution and the transfer mechanism has rotated the gear corresponding to the "hundreds of dollars" wheel one point.

As each transfer mechanism operates independently of the adjoining mechanisms, it will be seen that each time a trip pin 8' of any gear 8 trips a lever 22, the adjacent slide plate 21ᵃ is released and operates through its plunger 23 to actuate the gear corresponding to the register wheel of the next higher order of units. It will also be understood that in setting up or registering any number any one or more of the transfer mechanisms may be thrown into operation, that depending upon the prior positions of the various gears 8 and the amount of the number set up.

26 indicates as an entirety means for restoring or returning each transfer mechanism to normal position. Preferably these means operate to restore simultaneously all the transfer mechanisms that may have operated while setting up a number. Said means are under the control of the operator 17 so that when the latter is operated to return the slide bars 7 to zero position, the restoring means automatically re-set the transfer mechanisms.

Of these restoring means for the transfer or carrying-forward mechanism, b' indicates a curved slot formed in the main frame B'. 17¹ indicates a stud fixed to and extending laterally from the operator 17 through the slot b'. The stud 17¹ is preferably provided with an anti-friction roller 17ᵏ, the latter being loosely mounted on the stud and held in place by a suitable screw as shown in dotted lines—Fig. 5. 26ᵃ indicates an arm, suitably pivoted at 26ᵇ to the inner face of the frame B', whereby it may swing upwardly and downwardly, and resting at its free end upon the roller 17ᵏ. 26ᶜ indicates a thrust member, carried by the arm 26ᵃ, it being preferably formed integral therewith. As will be understood from Fig. 5, the thrust member 26ᶜ is arranged below and extends transversely across the forwardly extending arms 21ᵍ of the transfer slide plates 21ᵃ; and as the arm 26ᵃ swings upwardly, the thrust member 26ᶜ engages the walls of the recess 21ⁱ and moves the slide-plates 21ᵃ upwardly, against the tension of their springs 21ᶠ. When the plates 21ᵃ have been elevated, the triggers 22 automatically engage the shoulders 21ᵏ and lock them in that position.

In order to swing the arm 26 up and down, it is provided at 26ᵈ with a cam which extends across the slot b' and in the path of movement of the stud 17¹. By this construction it will be seen that when the operator 17 is drawn forward, the stud 17¹ in traversing the slot b' will engage the cam 26ᵈ and move or press the arm 26 upwardly, the roller 17ᵏ reducing the friction between stud 17¹ and cam 26ᵈ to a minimum. Upon the return of the stud 17¹ to the rear end of the slot b', the arm swings downwardly under the influence of gravity. In the arrangement of the parts shown, the arm 26ᵃ is cut away at 26ᵉ to avoid contact in its upward movement with the bracket or plate 21ᵉ.

Of the total printing means G, 27, 27, indicate a pair of supporting side plates, the innermost one of which is detachably secured to the frame B'. The plates 27 are removably supported relatively to each other and spaced apart by devices 27', which are preferably similar to that employed for the plates 3 herein described.

27ᵃ indicates as an entirety a suitable support or positioning frame for a strip of paper, whereby the total amount added, accumulated or registered by the register wheels 4 can be printed thereon. This frame is interposed between the registering wheels 4 and the front ends of the supporting plates 27. The frame 27ᵃ preferably comprises a pair of sheet metal plates 27ᵇ between the opposing walls of which the paper strip or sheet is introduced. Suitable stops indicated at 27ᵇ' may be provided in order that the paper can be properly positioned between the plates. The upper ends of the plates are flanged or curved outwardly to engage suitable bolts or screws 27ᶜ, the latter being connected with a supporting plate 27ᵈ which is screwed, or otherwise secured to the frame B'. At b² the case B² is formed with an opening to permit the insertion of a sheet or strip of paper between the plates 27ᵇ. Opposite the registering wheels 4, the plates are formed with suitable openings (see Fig. 32) to permit the inking of the characters on the registering wheels and the pressing of the paper thereagainst to effect the printing operation.

27ᵉ indicates a pair of rods extending between and supported at their opposite ends by the plates 27. 27ᶠ indicates a plunger member formed with a pair of slots 27ᶠ'' through which the rods 27ᵉ extend. The rods 27ᵉ serve as guides for the frame 27ᶠ whereby it may be moved toward and from the register wheels 4. As shown in the drawings, the plates 27 and guide rods 27ᵉ are arranged to slidably support and guide the plunger member 27ᶠ in a direction radially of the axes of the registering wheels 4 and through the alined characters thereof at the registering position. At its front end, the plunger member 27ᶠ is provided with a platen 27ˣ that engages with and presses the paper sheet or strip against the characters on the registering wheels 4, when the plunger is moved forwardly. The platen 27ˣ comprises a socket frame of a length to extend across the alined characters and carries a pad of suitable material to serve as a yieldable backing. The socket frame is preferably pivoted to the front end of the plunger 27ᶠ in order that it can adjust itself to the plane of the characters, the friction between the pivot bearings being sufficient to hold the platen socket frame in operative position. The front end walls of the guide slots 27ᶠ'' preferably engage with the guide rods 27ᵉ and operate as stops to limit the movements of the frame 27ᶠ rearwardly. 27ᵍ indicates pairs of spacing devices arranged on opposite sides of the frame 27ᶠ and between it and the inner or opposing faces of the side plates 27. These spacing devices position the plunger member relative to either side plate 27 and assist in guiding it backwardly and forwardly.

27ʰ indicates an upwardly extending arm or plate preferably formed integral with the plunger 27ᶠ. This arm or plate is formed with a slot 27ⁱ which extends at substantially right angles to the guide slots 27ᶠ''. The purpose of this slot will presently appear.

28 indicates a lever pivoted to one or both of the side plates 27. It preferably comprises a pair of U-shaped arms 28ᵃ arranged upon opposite sides of the plunger member 27ᶠ, being pivoted at 28ᵇ on the plates 27 and connected together by one or more tie rods 28ᶜ. One of the U-shaped arms 28ᵃ is extended upwardly through an elongated opening b³ in the case B² to form a handle 28ᵈ, by means of which the lever 28 can be operated. 28ᵉ indicates a rod or pin, preferably mounted at its opposite ends in the U-shaped arms 28ᵃ of the lever 28 and extending through the slot 27ⁱ of the arm 27ʰ. Through the engagement of this rod 28ᵉ with the opposite side walls of the slot 27ⁱ, a connection is made between the lever 28 and frame 27ᶠ, whereby the latter will be reciprocated by the lever 28 toward and from the register wheels 4 to operate the platen 27ˣ, the elongation of the slot 27ⁱ permitting relative movement between the arm 27ʰ and rod 28ᵉ as the frame moves in one direction or the other.

29 indicates a device for inking the numeral characters on the register wheels, whereby an impression of the amount accumulated or totaled thereon can be made directly from the numeral characters thereof. This device preferably comprises a roll 29ᵃ having an axle 29ᵇ, the opposite ends of which are mounted in bearings 28ᶠ formed in the free ends of the U-shaped arms 28ᵃ. The walls of the bearings 28ᶠ are preferably enlarged slightly to permit the axle to move or yield slightly against the tension of springs 29ᶜ, the free ends of which are bent over and removably hold the ends of the axle 29ᵇ in its bearings. The roller 29ᵃ is preferably covered with some material, such as felt, that will absorb and retain the ink.

Figure 2:
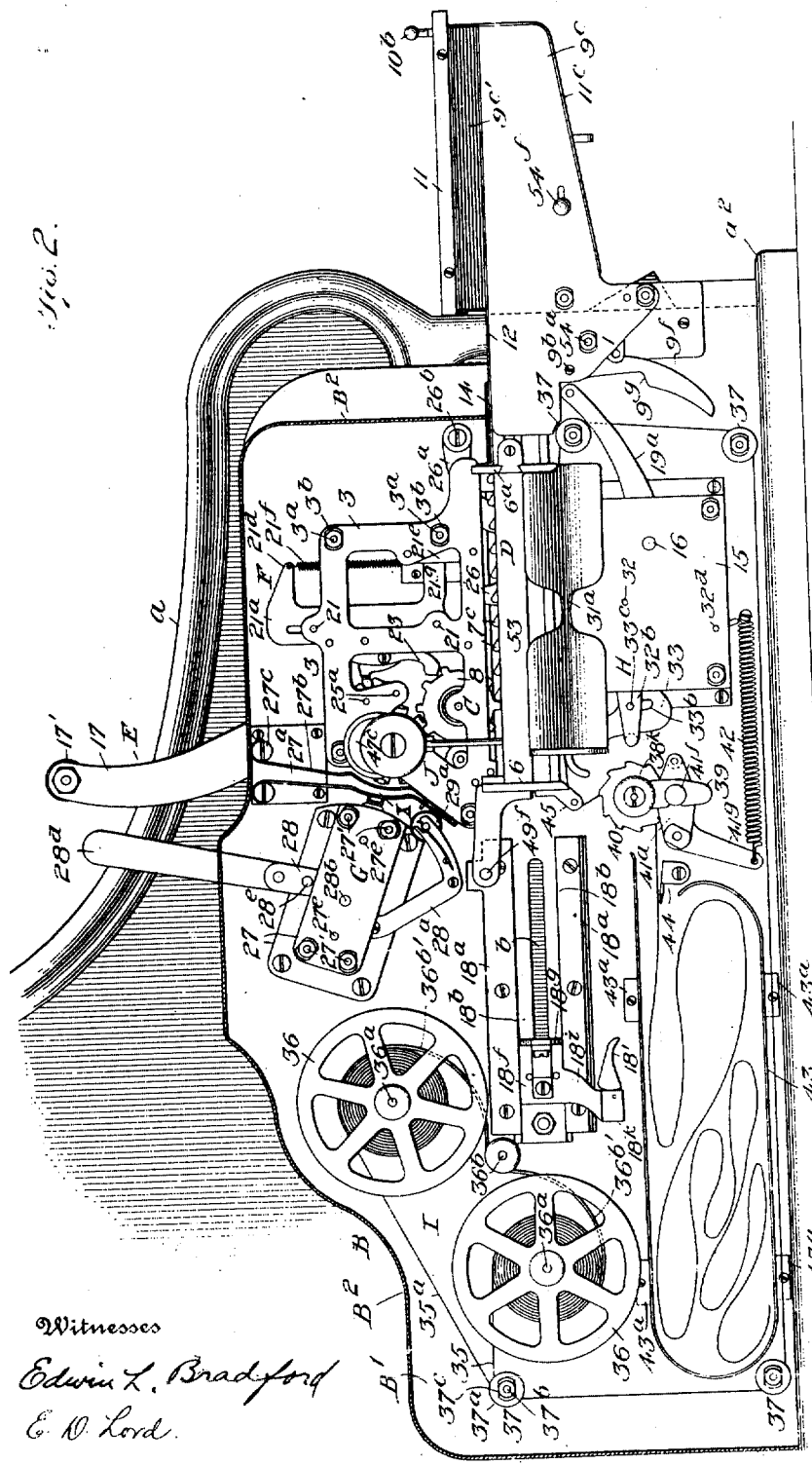
Fig. 2 is a side elevation of a portion of the apparatus, the near side of the casing for the auditing mechanism being omitted.

The normal position of the lever 28 and inking roller 29ᵃ, carried thereby, is shown in Fig. 2. To ink the characters, which is always done just prior to printing a total amount registered on a sheet of paper, the handle 28ᵈ of the lever 28 is moved rearwardly, as shown in Fig. 27. This operation moves the inking roller 29ᵃ upwardly across the face of the characters, and also moves the plunger 27ᶠ rearwardly. When the lever 28 is returned to normal position, the roller moves across the characters and again engages and inks them.

Following the inking operation, a slip of paper is introduced into the paper supporting frame 27ᵃ behind the registering wheels 4 and positioned to receive an impression therefrom. The printing operation is effected by the continued forward movement of the lever 28 which, acting through the plunger frame 27ᶠ, pushes the platen forwardly and presses the paper against the inked characters, as will be understood from Fig. 29.

I preferably provide the total printing mechanism with means which serve to return the lever 28 and plunger 27ᶠ to normal position at the end of the printing operation and also operate to maintain the platen out of contact with the register wheels. Of these means, 30 indicates a rod extending longitudinally of the plunger 27ᶠ and preferably supported at its opposite ends by the guide rods 27ᵉ and spacing sleeves 27ᵍ. Throughout a portion of its length, the rod 30 is reduced to form a shoulder 30ᵃ. 30ᵇ indicates a collar slidably mounted on the reduced portion of the rod and adapted to engage the shoulder 30ª which limits its rearward movement. 30° indicates a spring preferably coiled around the rod 30 and interposed between the adjacent sleeve 27ᵍ and the collar 30ᵇ, whereby it normally tends to move the collar rearwardly or against the shoulder 30ª.

27ᵏ indicates a plate or wall projecting laterally from the plunger 27ᶠ and formed with an opening through which the rod 30 extends. As will be understood from the drawing, this plate 27ᵏ is arranged to move into engagement with and slide the collar 30ᵇ along the rod 30 when the plunger 27ᶠ is moved forwardly to effect a printing operation. As a result of this operation the spring 30° is compressed and provided with energy to automatically return the plunger 27ᶠ and lever 28 to normal position after the printing impression is completed. The construction of the parts just described is preferably such that the lever 28 can be moved from its normal position rearwardly to operate the inking roller and back to normal position without causing engagement between the wall 27ᵏ and collar 30ᵇ and effecting a compression of the spring 30°; in other words, the wall 27ᵏ does not engage with and actuate the collar 30ᵇ until moved forwardly beyond a predetermined position. The effect of this arrangement and operation is to provide a signal for the operative which indicates to him that the inking operation has been completed and that the slip of paper must be introduced into the supporting frame 27ª before the lever is further advanced.

The lever 28 being U-shaped provides a simple form of reciprocating mechanism for operating the inking device and plunger 27ᶠ simultaneously in opposite directions. This construction is not only simple in form but also provides one operating member for inking the printing characters and completing the printing impression, that is to say, the inking roller being carried on one end of the lever and the plunger 27ᶠ being connected thereto on the opposite side of its pivot, the plunger 27ᶠ is moved away from the register wheels when the inking roller is moved into engagement therewith; and on the other hand, when the inking roller is moved away from the register wheels the plunger is moved toward them.

It will be understood that the total printing mechanism G just described prints the total amount of all the amounts or numbers set up, registered by or accumulated on the registering wheels; whereas the individual transaction printing means H operate to print the amount of each transaction or number which is set up and added by the registering wheels.

Of the individual transaction printing means H, 31 indicates a series of printing characters, consisting of the figures 0, 1, 2, etc., arranged *seriatim* and mounted on the lower edge or face of each slide bar 7, one behind the other. The characters are spaced from each other uniform distances corresponding to the length of separation between the rack dogs 7°, so that the respective characters 31 will be brought to printing position according to the distance the different slide bars are operated rearwardly in setting up a number. As will be understood, the printing characters 31 are arranged in an inverse order with respect to the characters on the keyboard 11, and that those on one bar are arranged opposite to or in line with similar characters on the other bars (see Fig. 13) when the latter are at "zero" position, all of the "0" characters 31 being at the printing position. By this arrangement and construction, it will be seen that when one or more of the slide bars 7 are moved rearwardly to set up or register a number the characters 31 on the operated bars comprising such number will be brought to the printing position where an impression can be made from such arranged characters and the number thus set up printed on a slip of paper, as will be presently described. This arrangement will be clearly understood from Fig. 14, where the bars are shown in the position to print 958.76 which is the amount shown as set up in Figs. 11 and 12.

31ª indicates a positioning frame adapted to receive and support a paper slip or bill on which the number set up is to be printed. This frame is arranged below and horizontally of, but slightly spaced from the printing characters 31. It is preferably formed from sheet metal and comprises upper and lower walls 31ᵇ. These walls are provided with feet 31° at their inner ends, whereby the frame can be fixed to the main frame B'. The plates or walls 31ᵇ are spaced from each other by strips or equivalent devices 31ᵈ, which may also serve as end walls to determine the position of the paper slip when introduced in the frame. Along their outer edges, the plates 31ᵇ are flared or curved laterally in opposite directions to permit the easy introduction of the paper slip. The flared portions may also be cut away to receive the fingers of the operative, so that the paper slip can be pushed in the required distance and easily grasped when removed. 31ᵉ indicates openings formed in the plates 31ᵇ and relative to which the paper slip is positioned to permit printing thereon.

32 indicates a shaft or rod mounted at its opposite ends in the plates 15 and forming the axis or pivot for a swingable frame 32ª.

This frame preferably comprises side members 32$^b$ and a rear member 32$^{b'}$ formed integrally, and the free ends of the side walls may be connected together by a connector 32$^c$.

32$^a$ indicates a rock member rotatably mounted at its opposite ends in the plates 15. This member is preferably flattened as shown at 32$^{d'}$ and formed with two spaced openings through it. The walls of these openings form slide bearings for a pair of slide rods 32$^e$. To the upper ends of the rods 32$^e$ is fixed a transverse thrust bar 32$^f$ that extends across and engages with the side members 32$^b$. 32$^g$ indicates a spring preferably of the coil type and surrounding each of the slide rods 32$^e$. The lower ends of these springs bear against the face 32$^{d'}$ and their upper ends bear against the thrust bar 32$^f$, and tend to normally push said bar upwardly. From this construction it will be seen that the springs, acting through the thrust bar, operate to support the swingable frame in a horizontal position or against a suitable abutment 32$^h$ which limits the upward movement thereof. The lower edges of the side members 32$^b$ are channeled slightly to form seats for the bar 32$^f$ and to permit relative movement between the bar and frame, incident to the swinging of the latter downwardly and forwardly about its axis (see dotted lines in Fig. 5). Since the supporting rods 32$^e$ for the thrust bar 32$^f$ are slidably mounted in a freely rocking member, it will be understood that the thrust bar is free to swing forwardly simultaneously as it is pressed downwardly by the frame 32$^a$.

33 indicates a hammer mechanism. This mechanism preferably consists of a plurality of hammer devices 33$'$, one for each slide bar 7, and each provided with a head 33$^a$, that projects upwardly, as shown in the drawings. The heads 33$^a$ are adapted to be impelled in an upward direction and to impart a blow to a strip or strips of paper and the individual slip which are arranged between them and the printing characters 31, and thus effect a printing impression from the latter.

The hammers 33$'$ are supported between the side members 32$^b$ of the frame 32$^a$, said hammers being loosely mounted at one end on a transverse shaft 32$'$ and free to swing within certain limits in vertical directions. At or near their opposite ends the hammers 33$'$ are formed with curved slots 33$^b$, the slot in one hammer alining with the slots in the remaining hammers. 33$^c$ indicates a supporting rod extending through the slots 33$^b$ and fixed at its opposite ends in the side members 32$^b$. As will be clearly understood from the drawings, the hammers rest upon and are normally supported by the rod 33$^c$, but are free to swing upwardly relative to the swingable frame to impart a blow against the printing characters 31.

34 indicates a device for swinging the frame 32$^a$ downwardly and compressing the springs 32$^g$. This device preferably comprises a sleeve or collar 34$^a$ adjustably mounted on the main rock shaft 16 and a nose and trip 34$^b$ connected thereto. The sleeve or collar 34$^a$ may be provided with a screw-threaded opening to take a set screw that secures it to the shaft 16. The trip 34$^b$ extends laterally from the sleeve 34$^a$ into engagement with the end or rear member 32$^{b'}$ of the frame 32$^a$. When the rock shaft 16 is rotated in the forward direction, the nose 34$^b$ will swing the front end of the frame upwardly and the rear end thereof, and the hammers 33$'$ carried thereby, downwardly.

This movement will compress the springs 32$^g$ and will continue until the nose 34$^b$ frees itself from the rear member 32$^{b'}$. Upon the release of the frame 32$^a$ from the nose 34$^b$, the springs 32$^g$ will thrust the frame 32$^a$ upwardly against the abument 32$^h$ with considerable force. The frame in turn imparts momentum to the hammers 33$'$ and causes them to move upwardly, after it has been arrested, and strike the printing characters 31. Since the hammers 33$'$ are loosely mounted on the rod 32$'$, their heads 33$^a$ strike the characters a quick sharp blow and then fall backwardly under the influence of gravity to normal position.

As shown in Fig. 33, the collar 34$^a$ is grooved or cut away as shown at 34$^c$ to form a recess in which the nose 34$^b$ is mounted on a pivot 34$^d$, one wall of the recess forming an abutment for the nose 34$^b$ so that it can operate the frame 32$^a$ when the shaft 16 is rotated. When the shaft is returned to its normal or starting position, the nose 34$^b$ swings on its pivot and thus rides the rear member 32$^{b'}$ ready to engage its lower edge in the next operation of the shaft 16. I preferably provide a spring 34$^e$ which engages the nose 34$^b$ and tends to swing its frame-engaging end outwardly as clearly shown in Fig. 33.

It will be clearly understood from the drawings (see particularly Fig. 5) and the foregoing description that, if the printing characters 31 be inked, or an inking ribbon or carbon sheet be introduced between these characters and the slip of paper introduced in the positioning frame 31$^a$, the number set up can be printed on such slip when the hammers 33 are operated. In the preferred form of my invention I provide a carbon sheet for making the impression from the printing characters and also a second carbon sheet whereby a duplicate impression can be made of each number set up. In carrying out these objects of the invention I prefer to provide two superposed strips of carbonized paper 35, 35$^a$, and means for feeding the strips step by step, automatically, relative to the impression position for the characters 31, as indicated as an entirety at I. Both of the strips 35, 35$^a$, are carbonized on their lower surfaces, the carbon on the lower strip 35 serving to transfer the impression to the individual slip or bill introduced in the holder 31$^a$ and the carbon on the upper strip 35$^a$ serving to transfer the impression from the characters 31 to the upper face of the strip 35. As this latter strip is progressed at each complete operation of setting up a number and restoring the slide bars 7 to normal position, it follows that the numbers registered or accumulated will be listed thereon. At the end of any period, that portion of the strip bearing the listed numbers can be removed and introduced into the frame 27$^a$ and the total registered by the registering wheels 4 printed thereon. This total will be the sum of the listed numbers.

Of the paper strip supply and advancing means I, 36 indicates a pair of spools on which the strips 35, 35$^a$, are wound. Each of these spools is loosely mounted on a rod or axle 36$^a$ carried by the frame B' and preferably arranged rearward of the registering and printing mechanisms but adapted to be inclosed by the casing B. 36$^b$ indicates a fixed arm or bracket, arranged between the spools, for supporting a pair of spring plates 36$^{b'}$ the outer ends of which press lightly against the outer convolutions of the rolled strips. These plates act as brakes and serve to retard the unwinding of the strips and in such manner keep the strips under sufficient tension to prevent buckling or lapping as it is drawn from the spools and guided to the printing position.

37 indicates a plurality of guide devices over and around which the strips are guided from the spools 36 to the impression position. Each of these devices preferably comprises a flanged roller 37$^a$ loosely mounted on a rod or axle 37$^b$ which is carried by the main frame B'. Each roller 37$^a$ is preferably held on the adjacent rod 37$^b$ by a nut 37$^c$ screw threaded to the outer end thereof. As will be seen from the drawings,—especially Fig. 2,—the guide devices 37 guide the strips downwardly to a point near the lower edge of the main frame B' and then forwardly beyond the positioning frame 31$^a$, where it is guided upwardly and finally directed rearwardly between the frame 31$^a$ and printing characters 31, and over the openings 31$^e$.

38 indicates the paper advancing devices preferably comprising two rollers 38$^a$, 38$^b$, arranged to receive the strips 35, 35$^a$, between them. These rollers are preferably knurled or roughened, as shown at 38', to increase the friction between them and the strips. The roller 38$^a$ is loose upon a rod 38$^c$ that extends through the main frame B'. The inner end of the rod 38$^c$ is provided with flanges 38$^d$ by means of which it can be fixed to the frame B'. As shown at 38$^e$, the roller 38$^a$ is rabbeted to form a wall or shoulder with which the head of a screw 38$^f$, mounted in the outer end of the rod 38$^c$, engages to secure the roller thereon. 38$^g$ indicates a plate, preferably of the same shape and size as the roller 38$^a$ and fixed to the outer end thereof by a plurality of screws 38$^h$ (only one screw being shown). The face of the plate 38$^g$ is provided with a collar or circular wall 38$^i$ which forms a bearing for a link 39. Projecting laterally from the center of the plate is a stud having screw threads to receive a nut 38$^k$. This nut when tightened serves to maintain the link in position and also serves as a means for turning the roller 38$^a$ manually when it is desired to advance the paper strips 35, 35$^a$. 38$^m$ indicates a lock device for the nut 38$^k$.

40 indicates a ratchet arranged between the main frame B' and the inner end of the roller 38$^a$, being preferably fixed to the latter by suitable screws 40$^a$. The teeth of the ratchet are arranged to be engaged by the pawl 18' so that each time the pusher 18 moves forwardly to restore the slide bars 7 to zero position, the pawl 18' will engage the ratchet and rotate it the distance of one tooth. As a result of this operation the paper strips 35, 35$^a$, will be advanced one step relative to the printing position. Since the pusher 18 does not commence to move forwardly until the rear end walls of the slot 17$^f$ engage the pins 17$^g$, the operation of the individual printing mechanism, which is operated by the nose 34$^b$, will be completed by the time the pawl 18' engages with and operates the ratchet 40. The pawl 18' being pivoted to the arm 18$^i$ rides the ratchet in a well known manner as the pusher recedes.

The means for supporting the roller 38$^b$ preferably comprise a pair of spaced plates 41, 41$^a$, connected together at their opposite ends by rods 41$^b$, 41$^c$, the former of which extends through the innermost plate 41 and, being supported at its inner end in the main frame B', forms a pivot or axle on which the plates 41, 41$^a$, swing. The rod 41$^b$ is preferably provided with a roller 41$^d$ over which the strips are guided after being advanced by the rollers 38$^a$, 38$^b$. 41$^e$ indicates a shaft supported between the plates 41, 41$^a$, and serving to loosely support the roller 38$^b$. The inner end of the shaft 41$^e$ has screw threaded connection with the plate 41, while its opposite end extends through the plate 41ᵃ and is provided with a capped end 41ᶠ. The link 39 is formed with a slot or recess 39ᵃ, extending inwardly from one edge and adapted to receive the capped end 41ᶠ, as clearly shown in Figs. 21 and 22. The link 39 in this manner operates to maintain the axes of the rollers 38ᵃ, 38ᵇ, stationary with reference to each other, and to lock the plates 41, 41ᵃ, against movement. It also serves to maintain the advancing rollers parallel to each other.

41ᵍ indicates an arm preferably formed integral with and depending from the rear end of the plate 41. At the free end of the arm 41ᵍ is attached one end of a spring 42. The opposite end of the spring 42 is fixed to some stationary part of the main frame B' in a well known manner. The function of the spring 42 is to normally force the roller 38ᵇ toward the roller 38ᵃ. When the link 39 is detached from the cap 41ᶠ, the plates 41, 41ᵃ, can be swung downwardly in opposition to the spring 42 to permit the insertion of the paper strips 35, 35ᵃ. Upon the release of the plates 41, 41ᵃ, the spring will force them upwardly and cause the roller 38ᵇ to yieldingly engage the paper strips, while the operative is connecting the link 39 to the cap 41ᶠ.

43 indicates a sheet metal plate provided with feet 43ᵃ by means of which it is detachably secured to the main frame B'. The plate 43 projects laterally from the frame B' approximately to the inner face of the casing B². It extends from a point near the advancing rolls 38ᵃ, 38ᵇ, rearwardly; near the rear end of the main frame B', the plate is bent downwardly and then forwardly, its free end being curved upwardly.

As will be understood from the drawings (see Fig. 2) the plate 43 serves as the top, bottom, rear and front walls of a receptacle or pocket into which the used portions of the strips 35, 35ᵃ, are delivered by the advancing rolls 38ᵃ, 38ᵇ; the frame B' and casing B² serving as the side walls of the pocket.

44 indicates a cutter or perforator by means of which the used portions of the strips 35, 35ᵃ, can be severed from the remaining portions thereof and removed from the pocket. For instance, when it is desired to print the total of all the numbers set up or registered by the wheels 4 and which numbers of course have been listed on the strip 35, the strips 35, 35ᵃ, are advanced forwardly until the last listed number passes the cutter 44. The strips 35, 35ᵃ, are then severed and the lower end of the strip 35 is introduced into the printing frame 27ᵃ and the total printed thereon below the last listed number. The paper strips are preferably advanced forwardly by manually rotating the nut 38ᵏ, which in turn operates the roller 38ᵃ, but if desired the operator 17 can be reciprocated backwardly and forwardly a sufficient number of times to advance the paper strips through the pawl and ratchet devices until the last listed number passes the perforator.

The perforator 44 preferably consists of a plate 44ᵃ supported by a rod 44ᵇ that extends horizontally from the main frame B' and a series of teeth or perforating points 44ᶜ extending from the rear edge of the plate 44ᵃ. The plate 44ᵃ may also serve as a guide to direct the paper strips 35, 35ᵃ from the advancing rolls 38ᵃ, 38ᵇ, into the strip-receiving receptacle.

45 indicates a guide device interposed between the rear end of the positioning frame 31ᵃ and the advancing devices 38ᵃ, 38ᵇ, and serving to guide the paper downwardly and in front of the latter. This guide device may comprise a roller 45ᵃ having projecting axle members 45ᵇ at its opposite ends, which members are loosely mounted in suitable arms depending from the ends of the slide bar guide plate 6.

Of the register wheel resetting devices J, 46 indicates a slidable device, preferably comprising two sleeve members mounted on an extended portion of the shaft 3ᵈ. The device may be enlarged at its outer end and also knurled, whereby it can be readily rotated to turn the shaft and re-set the register wheels 4, as has already been described. The sleeve members are connected together by a screw 46ˣ (see dotted lines in Fig. 7). One of said members is operatively connected to the shaft 3ᵈ by means of a feather 46ᵃ and groove 3ᵈ′, the latter being formed in the shaft, to permit sliding of the device 46 longitudinally of the shaft, as shown in Fig. 7. 46ᶜ indicates a lock preferably comprising a pin projecting from the inner end or face of the sleeve member and fitting an opening 3ˣ formed therefor in the adjacent plate 3. At 46ᵈ the inner wall of the sleeve member is enlarged to form an annular recess around the shaft 3ᵈ. 46ᵉ indicates a coil spring surrounding the shaft 3ᵈ and mounted in the recess 46ᵈ. The inner end of the spring bears against the bottom wall of the recess 46ᵈ, while its opposite end engages the head of a screw 46ᶠ mounted in the end of the shaft 3ᵈ. The screw 46ᶠ acting through the spring 46ᵉ detachably holds the sleeve member 46 on the shaft; whereas the spring tends to force the said member toward the supporting plate 3, thus maintaining the lock pin 46ᶜ in operative position, but permits the longitudinal sliding of said member along the shaft 3ᵈ to release the lock pin when the register wheels 4 are to be reset. The lock pin 46ᶜ and the opening 3ˣ therefor are preferably so arranged relative to the groove 3ᵗ formed in the shaft 3ᵈ that in the resetting operation the pin 46ᶜ and opening 3ˣ register with each other at the time the "0" characters on the register wheels come to the starting position or opposite the printing position X.

At 46' the sleeve member 46 may be provided with ratchet teeth with which co-acts a pawl 3$^k$ pivoted on the adjacent plate 3. The purpose of this ratchet mechanism is to prevent the rotation of the sleeve member 46 in the wrong direction. The pawl and ratchet teeth may be of such width that they will not become disengaged from each other when the sleeve is moved longitudinally of the shaft 3$^d$, and unlocked for rotation.

In the operation of the sleeve member 46 it is first moved longitudinally and then rotated slightly to permit the pin to bear against the adjacent face of the plate 3 under the influence of the spring 46$^e$. The rotation of the sleeve member is then continued until the pin 46$^c$ drops into the opening 3$^x$. The construction, when operated in the manner just described, automatically operates to stop the rotation of the shaft 3$^d$ when the register wheels 4 are re-set at zero; and it also indicates to the operative that the resetting operation has been completed.

As a test of the condition or position of the register wheels 4, the characters can be inked, a slip of paper then introduced in the frame 27$^a$ and an impression made thereon. In this connection, it will be understood that a printing impression can be taken from the register wheel characters at any time it is desired to ascertain the total accumulated thereon.

47 indicates a device for indicating on the strip 35 when and at what point the register wheels have been re-set. It is preferably under the control of and actuated automatically by the resetting devices J. The device 47 may comprise a plunger or tool 47$^a$ and an eccentric mechanism 47$^b$ for moving the tool up and down. The eccentric mechanism may consist of an eccentric 47$^c$ arranged to be rotated by the resetting device 46 and a ring 47$^d$ in which the eccentric turns. The eccentric 47$^c$ is preferably interposed between the two members constituting the resetting device 46 and secured thereto by the screw 46$^x$. The ring 47$^d$ being connected to the tool 47$^a$, operates the latter in a well known manner. When the shaft 3$^d$ and the resetting device 46 are in normal position, the eccentric 47$^c$ and ring 47$^d$ support the tool 47$^a$ in its elevated position. It follows from this construction and arrangement that in one complete rotation of the device 46 to re-set the register wheels 4, the tool 47$^a$ will be moved downwardly and upwardly to normal position. At its lower end the tool 47$^a$ may be pointed and when moved downwardly it will pierce the paper strips. When the strip 35 is removed such opening will indicate that at that point the register wheels were re-set and that the numbers included in the accumulated total commenced therewith.

The resetting devices J permit the resetting of the registering wheels back to starting position at any time and as often as it is desired, but at each operation thereof the indicating tool 47$^a$ pierces the strips and thus indicates exactly where the resetting operation occurred. This construction will be found advantageous in the various uses to which the apparatus is adapted and will also serve to obviate mistakes in case the wheels 4 are re-set at any time between two set-up numbers, by designating where the numbers totaled, commenced.

As shown in the drawings, the upper end of the tool 47$^a$ is pivoted to the ring 47$^d$; while its lower end is loosely mounted to slide in an opening 47$^e$ formed in an L-bracket 47$^f$, the latter being fixed to the front face of the guide plate 6. This form of construction permits the sleeve 46 to move longitudinally on the shaft 3$^d$ without affecting the operation of the tool 47$^a$.

48 indicates a device carrying a special character or mark for indicating one or more numbers listed on the strip 35, at will. One practical use of the number-indicating device consists in designating that number or numbers in the list in which a mistake occurred in setting it or them up.

This device comprises a slide bar 48$^a$ arranged parallel to the slide bars 7 and mounted in guides 6$^b$ formed therefor in the plates 6, 6$^a$, similar to the bars 7. It may also be provided with a notch 7$^h$ and controlled by a lock and release device 9. On its lower edge, the bar 48$^a$ is provided with a special printing character 48$^b$, (such character being the letter "E"—meaning error), which is adapted to make a printing impression on the strip 35 when moved to the printing position and the individual printing mechanism has been operated. At its front end, the bar 48$^a$ is provided with a key by means of which it can be operated. The key depends downwardly and extends through an elongated slot 11$^{c'}$ formed in the front wall 11$^c$. The normal position of the bar 48$^a$ is shown in Figs. 13 and 14. If it is moved rearwardly the distance of one notch 7$^h$, the character "E" will be arranged in the printing position in line with the characters 31 comprising a set-up number. If now the operator 17 is operated, an impression will be made from all the alined characters 31 including the character "E". When the strip 35 bearing the listed numbers is removed and the total or sum thereof obtained from the wheels 4, the amount of the number designated by the letter "E" may then be deducted from such total and the exact sum of the correctly listed numbers ascertained. Since the bar 48$^a$ lies in the same horizontal plane with the slide bars 7, it will be engaged by the pusher 18 and returned to normal position simultaneously therewith.

49 indicates as an entirety an interlock mechanism between the frames A and the auditing mechanism. This mechanism is preferably actuated by and under the control of one of the frames and operates to lock and release the auditing mechanism. 49$^a$ indicates a rock shaft extending through that wall of the casing $a$ adjacent to the main frame B', suitable bearings 49$^b$, 49$^c$, carried by the casing $a$, being provided therefor. That end of the shaft 49$^a$ outside the casing $a$, is provided with a depending arm 49$^d$, while its opposite end is provided with an arm 49$^e$ which extends upwardly through an opening formed in the shelf for the frames A. The arms 49$^d$ and 49$^e$ are fixed to the shaft 49$^a$ and may be arranged thereon to have bearing engagement with the opposite outer side walls of the bearings 49$^b$, 49$^c$, to prevent endwise movement of the shaft in said bearings. 49$^f$ indicates a shaft mounted in suitable bearings in the main frame B' and extending laterally from either face thereof. As this shaft 49$^f$ lies in the path of movement of the link 17$^a$, the latter is provided with wings 17$^{a'}$ in which is formed a curved slot 17$^{a''}$ to receive the shaft. This construction permits the free operation of the link 17$^a$ by the operator 17 without engagement with the shaft 49$^f$ in a well known manner. 49$^g$ indicates a segment fixed to the shaft 49$^f$ on that end adjacent to the casing $a$. 49$^h$ indicates a connector pivotally connected at its front and rear ends to the segment 49$^g$ and arm 49$^d$, respectively. 49$^i$ indicates a spring one end of which is suitably fixed to the main frame B' at 49$^k$ and its opposite end is preferably connected to the segment 49$^g$. This spring is normally arranged to force the segment 49$^g$ rearwardly, which segment in turn, acting through the link or connector 49$^h$ and arm 49$^d$, will swing the arm 49$^e$ forwardly, the movement of the latter being preferably limited by the walls of the opening in the supporting shelf. As will be understood, in the type of structure shown, the operation of swinging the front frame indicated at $a'$ and each succeeding frame forwardly and backwardly causes the lower ends of the remaining frames to move forwardly and rearwardly. When access is made therefore to any frame in the series, the reclining of the front frame or additional frames therewith to the horizontal position, will move the rear end frame forwardly and allow the arm 49$^e$ to swing about its axis under the influence of the spring 49$^i$. Upon the return of the frame $a'$ to normal position, the rear end frame will engage the arm 49$^e$ and move it rearwardly in opposition to the spring 49$^i$. Thus it will be seen, each time the front end frame $a'$ is reclined, the segment 49$^g$ is allowed to be operated by the spring 49$^i$ in one direction and when the front end frame is swung back, the segment 49$^g$ is returned to its first position.

50 indicates a lock member arranged to engage with and lock the slide bars 7 against movement. It is fixed to the inner end of the shaft 49$^f$ and operated thereby to lock and release the bars 7. The member 50 may comprise a pair of side arms 50$^a$ connected together by a cross bar 50$^b$, these parts being so arranged on the shaft 49$^f$ that they will lock the bars 7 when the segment 49$^g$ is moved to the forward position. When in the operative position, the free ends of the arms 50$^a$, which extend slightly beyond the cross bar 50$^b$, engage with the upper surfaces of the slide bars, while the cross bar 50$^b$ lies behind the bars 7 and forms an abutment therefor to prevent their operation.

51 indicates an auxiliary lock member for locking the operator 17 in normal position. The member 51 preferably comprises an arm 51$^a$ fixed to and operated by the segment 49$^g$. At its forward or free end, the arm is provided with a hook 51$^b$, which is adapted to engage a pin or projection 17$^{d'}$. As shown, this lock pin may be the extended end of the pivot 17$^d$ to which the connecting device 17$^c$ is pivoted. As will be clearly seen from the drawings (see Figs. 3 and 25), if the segment 49$^g$ is moved rearwardly under the influence of the spring 49$^i$ after the operation of the frames A, the arm 51$^a$ will be swung upwardly. This operation will release the operator 17. On the other hand, if the segment 49$^g$ is returned to its first position, the arm 51$^a$ will swing downwardly and, through its hook 51$^b$ and the pin 17$^{d'}$, lock the operator 17. If desired, the arm 51$^a$ may be provided with a pivoted dog, free to swing in one direction, so that in case the arm 51$^a$ is moved downwardly at a time when the operator 17 is not in its normal position, the pin 17$^{d'}$ of the operator will move by the dog and become automatically locked.

From the foregoing description, it will be seen that when all the frames A are in normal or vertical position, the auditing mechanism is locked against operation, but upon the operation of the front end frame $a'$, the interlock mechanism is actuated and the auditing mechanism released.

As it is intended in one practical use of the apparatus to set up and register only those amounts called for on the bill slips filed on the frames A, the interlock mechanism serves to lock the registering mechanism against operation at all times except when the frames A are operated. The total amount registered on the register wheels 4 will correspond therefore to the sum of the amounts shown by the slips filed.

52 indicates a set of auxiliary slide bars for printing the number of the customer's account upon the bill slip and the record strip 35. 53 indicates a separate or additional set of auxiliary slide bars for printing the number of the clerk, who completed the transaction or made the sale, upon the bill slip and the record strip 35. As shown, three bars 52 are provided for printing the customer's account number, and two bars 53 are provided for printing the number that designates the clerk. The number of bars for the sets of bars 52, 53, may be increased or diminished accordingly as circumstances may require.

As will be understood from the drawings, the bars 52, 53, are similar in construction to the slide bars 7, being arranged at one side thereof and slidably mounted in suitable openings 6$^b$ formed in the supporting plates 6, 6$^a$. At their front ends the bars 52, 53, are provided with keys 10 each of which extends through a slot 11$^a$ in the keyboard 11, whereby each key may be operated. Each of the bars 52, 53, carries on its upper surface at 52$^a$, 53$^a$, respectively, the characters 0, 1, 2, 3, etc., arranged seriatim, which move relative to the openings 12$^a$ in the plate 12 when the bars are operated. Rearward of the openings 12$^a$, the name-carrying plate 14 is provided with suitable headings 52$^b$, 53$^b$, to designate the set of bars 52, 53. On its lower surface or edge, each bar 52, 53, is provided at 52$^c$ with the printing characters 0, 1, 2, 3, etc., which are arranged similar to and adapted to aline with the printing characters 31 of the slide bars 7 when in normal position. The bars 52, 53, are moved rearwardly the proper distances, according to the number of the clerk operating the apparatus and the number designating a customer to whom a sale has been made to position their respective printing characters 52$^c$ composing those numbers into alinement at the printing position.

This construction and arrangement will be clearly understood from Figs. 11 and 14, wherein the bars 52 have been operated to print the customer's account numbered "567" and the bars 53 have been positioned to print the number "34", this being the number of the clerk making the sale.

Figure 6:
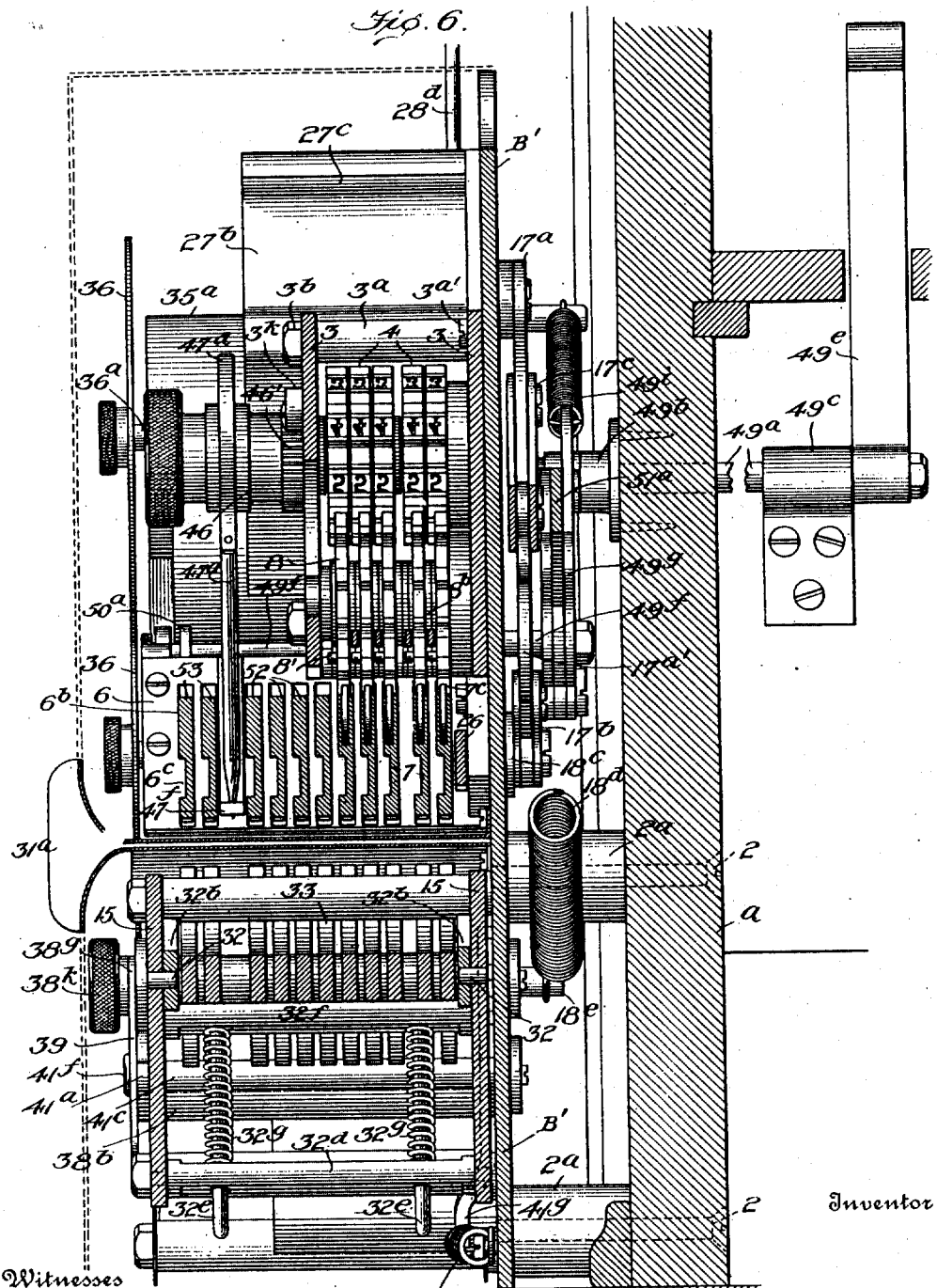
Fig. 6 is a transverse sectional view on the line 6—6 of Fig. 5.

As shown in Figs. 6, 7, and 9, a hammer device 33′ is provided for each bar 52, 53, so that upon the operation of the operator 17 and the individual printing means H, an impression will be simultaneously taken from the register wheel slide bars 7 and the auxiliary bars 52 and 53.

Preferably each bar 52, 53, is provided with a series of notches with which coöperates a combined locating and locking device 9. In this manner, these bars are controlled in a manner similar to the bars 7.

After each operation of the bars 52, 53, they are returned to normal position by the pusher 18 simultaneously with the slide bars 7.

54 indicates a release member the purpose of which is to operate those locating and locking devices 9 which control the bars 52, 53, and permit the return of the latter to normal position after operation. This release member is provided in order that the bars 52, 53, can be moved back to normal position and re-operated in case the clerk makes an error in operating either of them. Since the release member is only operable to release the bars 52, 53, a mistake made in setting up the amount of a sale can only be rectified, as hereinbefore described, by the operation of the "error" key and the subtraction of the amount designated thereby from the final total.

The release member 54 preferably comprises a shaft 54$^a$ mounted in a well known manner in the side plates 9$^c$, and a sleeve 54$^b$ loosely mounted thereon and carrying an arm 54$^c$ which extends horizontally below the lever extensions 9$^h$ of the adjacent locating and locking devices 9 that control the bars 52, 53. The arm 54$^c$ is arranged to move upwardly, and engage with, and swing the extensions 9$^h$ upwardly. This operation will have the effect of moving the arms 9$^d$ of the adjacent levers 9$^a$ downwardly and out of engagement with the notches 7$^h$ of the bars 52, 53, after which the latter can be moved back to starting position. As shown in Fig. 8, the sleeve 54$^b$ is provided at one end with a crank 54$^d$ to which one end of a link 54$^e$ is pivotally connected. The opposite end of the link is provided with a handle or thrust piece 54$^f$, that projects through and is slidably supported in an opening formed in the side plate 11$^c$. Upon the operation of the handle 54$^f$, in a well known manner, the arm 54$^c$ will raise the adjacent extensions 9$^h$ and depress the arms 9$^d$, whereupon the bars 52, 53, can be returned either to normal position or far enough to bring the correct printing character 52$^c$ to the printing position.

In a construction such as I have disclosed it will be seen that upon removing the case B$^2$, all the several parts of the apparatus are exposed to view; also that the several parts or mechanisms of the apparatus are capable of adjustment, dismantling and assembly separate from each other, thus permitting repair and replacement in a simple and easy manner.

To those skilled in the art of making apparatus of the class described, many alterations in construction and widely differing embodiments and applications of my invention will suggest themselves, without departing from the spirit and scope thereof. My disclosures and the description therein are purely illustrative, and are not intended to be in any sense limiting.

The complete operation of the apparatus in connection with a sale of goods may be described. It will be assumed that the customer carries an account with the merchant and that a section numbered 567 in one of the filing frames has been assigned to him; that the clerk who sold the goods is designated by the number 34; and the sale amounted to 958.76. As soon as the sale is written on the transaction slip, the clerk steps to the apparatus to record the transaction. First, however, he refers to the index of the apparatus to ascertain the customer's account number (in case he does not remember it) and then operates the holders or frames A from their normal position to a horizontal position to expose the account and ascertain the total thereof up to the present transaction. The operation of the frames A automatically operates the interlock mechanism 49 to permit movement of the slide bars 7, 52 and 53, and the actuator 17. Then, commencing at the left, the clerk pushes rearwardly the keys of the bars 53 to position them opposite the numbers "3" and "4" on the key board. This operation brings to view in the left hand sight opening 12ª the reading characters 53ª to show the clerk's number 34; and also moves the printing characters 52ᶜ of the bars 53 to the printing position to print the same number. Next, the keys of the bars designated by the reference numeral 52 are operated to positions opposite the numbers "5", "6" and "7", on the key board, the effect of which is to show the customer's number 567 through another one of the sight openings 12ª, and also arrange the printing characters 52ᶜ of the bars 52 in position for printing that number. The next operation is to set up the amount of the sale. For this purpose each of the keys of the bars 7 is moved rearwardly to positions opposite the numbers "9", "5", "8", "7" and "6" on the key board. This operation moves the bars 7 rearwardly and causes the number 95876 to appear through the other two sight openings 12ª. Such operation also positions the printing characters 31 at the printing position, whereby the amount of the sale can be printed on a record strip and the transaction slip, if desired. The rearward movement of the bars 7 also rotates the gears 8, which in turn rotate the register wheels 4 and accumulates thereon the amount of the number so set up.

The operator then inserts the transaction slip in the frame 31ª, using his left hand for convenience, and with his right hand grasps the handle 17' of the actuator 17 and pulls the same forwardly until the actuator is arrested by the front stop 20ⁱ on the main frame B'. The operator may then release the actuator 17, whereby it will return to normal position under the influence of spring 18ᵈ. The forward operation of the actuator 17 automatically operates the printing mechanism, whereby the number of the customer's account, the clerk's number and the amount of the sale is printed on the transaction slip and on the record strip, releases the locating and locking means 9 from the bars 7, 52 and 53 and slides the return member 18 forwardly to return said bars to normal position ready for the next transaction. The forward movement of the slide member 18 also actuates the paper feed mechanism to feed the paper forwardly one step, this operation being effected after the printing mechanism has operated. As will be understood, these operations take place in sequence so that the printing is effected before the bars 7, 52 and 53 are returned to normal position and are released subsequently to the printing operation but before the return member 18 engages them. In the event that one or more of the transfer mechanisms have operated as the result of setting up a number, the actuator also restores them to normal position.

The foregoing operations take place each time a transaction is made and result in printing upon the transaction slip and the record strip the amount of the sale, the clerk's number and the customer's number. Thus it will be seen that by means of the printing mechanism and the paper web supply and feeding means the transactions are listed on the record strip, and that by means of the register wheels and transfer mechanism the amounts of the transactions are added or registered. At any time, or at the close of the day, the used portion of the record strip can be severed and its end introduced in the strip receiving frame 27ª, and by means of the total printing mechanism, an impression may be taken from the characters on the register wheels 4, which will be the total of the listed transactions.

In the practical application of the invention to the keeping and recording of credit accounts in a one writing system, where a duplicate copy of the transaction is given to the customer as his record, it will be understood that both the original and duplicate transaction slips (with a suitable transfer means between them) are inserted in the frame 31ª, together, so that the printing impression is made upon the duplicate slip and original slip simultaneously.

What I claim is:—

1. In apparatus of the character described, the combination of a series of normally pivoted holders arranged to swing relatively to each other, an auditing mechanism, interlock mechanism between said holders and said auditing mechanism arranged to normally stop the operation of the latter and spring means for releasing the interlock mechanism when one or more holders are swung from normal position.

2. In an apparatus of the character described, the combination of a series of pivoted holders arranged to swing relative to each other, an auditing mechanism, and interlock mechanism between said holders and said auditing mechanism including a lock arranged to engage and disengage with the auditing mechanism, a spring normally tending to cause disengagement of the interlock mechanism from the auditing mechanism, and an arm normally maintained in the path of movement of one of the holders and actuated thereby to operate the lock.

3. In an apparatus of the character described, the combination of a series of holders having pivotal connections between them permitting said holders to swing relative to each other, an auditing mechanism, and connections between the holders and said auditing mechanism for locking and releasing the latter, the said connections including a spring for normally maintaining them in one position and an arm arranged to be engaged by the rear end holder when the holders swing into normal position, whereby the connections are actuated to engage with and lock the auditing mechanism.

4. In mechanism of the class described, the combination of a plurality of value carrying wheels mounted to rotate independently, a series of gears, one for each of said wheels, for rotating said wheels, a slidable bar corresponding to each of said gears, a plurality of spring controlled pivoted dogs carried by each bar and arranged to engage the teeth of the adjacent gear to drive it when the bar is moved in one direction, but arranged to ride the teeth of the gear when the bar is moved in the opposite direction, and a separate yielding stop for each gear.

5. In apparatus of the character described, the combination of a series of value carrying wheels, gears meshing therewith for rotating said wheels, a series of movable key bars, one for each gear, provided with teeth for engaging with and driving said gears, locating devices for said bars permitting them to move in one direction and arranged to normally stop the bars against return movement, means for releasing said bar locating devices from the bars, means for returning the bars to normal position after they have been released, and a common actuator for operating the releasing means and the bar return means.

6. In apparatus of the character described, the combination of a series of value carrying wheels, gears meshing therewith for rotating said wheels, a series of movable key bars, one for each gear, provided with teeth for engaging with and driving said gears, locating devices for said bars normally arranged to stop them against return movement, means for releasing said bar locating devices from the bars, means for returning the bars to normal position after they have been released, and a common actuator for operating the releasing means and the bar return means, the said bar return means including slidable connections with the actuator, whereby said return means are caused to operate at a predetermined time in the operation of the actuator.

7. In apparatus of the character described, the combination of a series of value carrying wheels, gears meshing therewith for rotating said wheels, a series of movable key bars, one for each gear, provided with teeth for engaging with and driving said gears, locating levers normally engaging said bars to position them in predetermined positions and permitting them to move in a direction to operate said value carrying wheels to add amounts, but arranged to stop the bars against movement in the opposite direction, the said levers being provided with cam walls, an actuator, an arm operated by said actuator for engaging the cam walls to release the locating levers from the key bars, and means operated by the same actuator for returning the key bars to normal position after they have been released.

8. In apparatus of the character described, the combination of a series of independently movable value carrying wheels, means for rotating said wheels progressively, to add amounts including a series of key bars, one for each wheel, movable in one direction to actuate said wheels, devices for locating said bars, at predetermined positions and arranged to stop them against return movement only, means for returning the bars to normal position, an actuator, connections between the actuator and the bar return means, arranged to operate the latter at a predetermined time in the movement of the actuator, and correlated means for releasing said locating levers from the key bars prior to their return to normal position.

9. In apparatus of the character described, the combination with supporting means including a vertically arranged main support, of a frame detachably connected to said support, the said frame comprising a pair of plates rigidly spaced relative to each other, a pair of shafts mounted in said plates, a series of value carrying wheels mounted on one of said shafts between the plates, a series of gears, each meshing with one of said wheels, mounted on the other shaft between the plates, transfer mechanism operatively supported between said plates and arranged to carry from one wheel to the next wheel, and a plurality of key bars movably supported by said main support in a plane below said frame and provided with teeth arranged to engage said gears to actuate the value carrying wheels, the said frame, value carrying wheels, gears and transfer mechanism being removable from said main support as a unit independently of the key bars.

10. In apparatus of the character described, the combination of a series of independently movable value carrying wheels, one for each order of units, means for rotating said wheels progressively to add amounts, the said means including a series of independently movable key bars, and a transfer mechanism for carrying forward from each value carrying wheel (except the wheel of the highest order of units) to the value carrying wheel of the next higher order of units, each transfer mechanism comprising a sliding device, a spring for operating said device, means for locking said device in operative position under tension of said spring, means for operating the locking means at a predetermined position of the adjacent value carrying wheel to release the adjacent device, and a plunger pivoted on said device for operating the wheel rotating means of the next higher order of units one point.

11. In apparatus of the character described, the combination of a series of independently movable value carrying wheels, one for each order of units, gears, one for each wheel, for rotating said wheels progressively to add amounts, a series of independently movable key bars provided with teeth for driving said gears, and a transfer mechanism for carrying forward from each value carrying wheel except the wheel of the highest order of units, each transfer mechanism comprising a sliding device, a spring for operating said device, means for locking said device in operative position under tension of said spring, means carried by the adjacent gear for operating the locking means to release the adjacent device, and a plunger pivoted on said device for moving the gear of the next higher order of units one point.

12. In apparatus of the character described, the combination of a series of independently movable value carrying wheels, one for each order of units, means for rotating said wheels progressively to add amounts, the said means including a series of independently movable key bars, a transfer mechanism for carrying forward from each value carrying wheel (except the wheel of the highest order of units) to the value carrying wheel of the next higher order of units, each transfer mechanism comprising a sliding device, a spring for operating said device, means for automatically locking said device in operative position, means for operating the locking means at a predetermined position of the adjacent value carrying wheel to release the adjacent device, a plunger pivoted on said device for operating the wheel rotating means of the next higher order of units one point, and means for returning said transfer mechanism to normal position and permitting said locking means to lock the device in operative position.

13. In apparatus of the character described, the combination of a series of independently movable value carrying wheels, one for each order of units, means for rotating said wheels progressively to add amounts, the said means including a series of independently movable key bars, a transfer mechanism for carrying forward from each value carrying wheel (except the wheel of the highest order of units) to the value carrying wheel of the next higher order of units, each transfer mechanism comprising a sliding device, a spring for operating said device, means for automatically locking said device in operative position, means for operating the locking means at a predetermined position of the adjacent value carrying wheel to release the adjacent device, a plunger pivoted on said device for operating the wheel rotating means of the next higher order of units one point, means for returning said key bars to normal position, an actuator for operating said bar return means, and means actuated by said actuator and common to said transfer mechanisms for returning them to normal position and permitting said locking means to lock the said devices in operative position.

14. In apparatus of the character described, the combination of a series of independently movable value carrying wheels, one for each order of units, means for rotating said wheels progressively to add amounts, the said means including a series of independently movable key members, a transfer mechanism for carrying forward from each value carrying wheel (except the wheel of the highest order of units) to the value carrying wheel of the next higher order of units, each transfer mechanism comprising a sliding device, a spring for operating said device, means for automatically locking said device in operative position, means for operating the locking means when the adjacent value carrying wheel passes a predetermined point to release the adjacent device, a plunger pivoted on said device for operating the wheel rotating means of the next higher order of units, means for returning said key members to normal position, an actuator for operating said key member return means, and cam means actuated by said actuator for returning said transfer mechanism to normal position and permitting said locking means to lock the said device in operative position.

15. In apparatus of the character described, the combination with a support, of a series of independently movable value carrying wheels, one for each order of units, rotatably mounted on said support, means for rotating said wheels progressively to add amounts, the said means including a series of independently movable key members, a transfer mechanism for carrying forward from each value carrying wheel (except the wheel of the highest order of units) to the value carrying wheel of the next higher order of units, including a spring for operating said mechanism, means for automatically locking each transfer mechanism in operative position under tension of said spring, means for operating the locking means when the adjacent value carrying wheel passes a predetermined point to release the transfer mechanism, means for returning said key members to normal position, an actuator for operating said key member return means, an arm pivoted to said support and common to and movable into engagement with said transfer mechanisms to return them to normal position and permitting said locking means to lock them in operative position, the said arm being provided with a cam, and a device carried by said actuator and arranged to engage said cam to operate the pivoted arm.

16. In apparatus of the character described, the combination with a support, of a series of independently movable value carrying wheels, one for each order of units, rotatably mounted on said support, means for rotating said wheels progressively to add amounts, the said means including a series of independently movable key members, automatic transfer mechanism for carrying forward from each value carrying wheel (except the wheel of the highest order of units) to the value carrying wheel of the next higher order of units, an actuator, means for returning said key members to normal position, devices for restoring the transfer mechanisms to normal position, and connections between said actuator and key member return means and said transfer mechanism restoring devices for actuating said means and devices simultaneously.

17. In apparatus of the character described, the combination of a series of independently movable value carrying wheels, means for rotating said wheels progressively to add amounts, the said means including a series of movable key members, means for locating said key members in predetermined positions to which they may be moved in one direction and arranged to stop said key members against movement in the opposite direction, means for releasing said locating means from said key members, transfer mechanisms for said value carrying wheels, devices for restoring said transfer mechanisms to normal position, means for returning said key members to normal position after they have been released, and an actuator having connections with said key member locating means, transfer mechanism restoring devices, and said key member return means for operating them simultaneously.

18. The combination of a series of independently movable value carrying wheels, means for rotating said wheels progressively to add amounts, the said means including a series of key bars, means slidably supporting said bars to move in an endwise direction, transfer mechanism for said value carrying wheels comprising a series of spring operated plates, means for slidably supporting said plates to move in a direction at substantially right angles to said key bars, and means for restoring said transfer mechanism to normal position.

19. The combination of a series of independently movable value carrying wheels, means for rotating said wheels progressively to add amounts, the said means including a series of key bars, means slidably supporting said bars to move in an endwise direction, transfer mechanism for said value carrying wheels comprising a series of spring operated plates, means for slidably supporting said plates to move in a direction at substantially right angles to said key bars, and cam operated means for restoring said transfer mechanism to normal position.

20. The combination of a series of independently movable value carrying wheels, a series of gears, each in mesh with a value carrying wheel, for rotating said wheels, transfer mechanism for carrying forward from the wheel of one order of units to the wheel of the next higher order of units, a series of endwise slidable key bars provided with teeth for driving said gears, locating means yieldably engaging each of said gears, locating devices yieldably engaging each of said key bars and coöperating with said gear locating means to position the value carrying wheels at predetermined positions, and means for returning said key bars to normal position.

21. The combination of a series of independently movable value carrying wheels, a series of gears, each in mesh with a value carrying wheel, for rotating said wheels, transfer mechanism for carrying forward from each order of units to the next higher order of units, a series of endwise slidable key bars provided with teeth for driving said gears, locating means yieldably engaging each of said gears, locating devices yieldably engaging said key bars and coöperating with said gear locating means to position the value carrying wheels at predetermined positions, and operating to normally stop said key bars against return movement, means for returning said key bars to normal position, means for releasing the key bar locating devices, and an actuator for operating said releasing means and said bar return means.

22. In apparatus of the character described, the combination with a vertically arranged support provided with a shaft, of a series of independently movable value carrying wheels, one for each order of units, loosely mounted on said shaft, means for rotating said wheels progressively to add amounts, the said means including a series of endwise movable key bars arranged side by side, means for slidably supporting said bars, transfer mechanism for carrying forward from each value carrying wheel (except the wheel of the highest order of units) to the value carrying wheel of the next higher order of units, an actuator, a reciprocating member for returning said key members to normal position, means for slidably supporting said reciprocating member on said vertical support, and connections between said actuator and said reciprocating member for actuating it.

23. In apparatus of the character described, the combination of a series of independently movable value carrying wheels, means for rotating said wheels progressively to add amounts, the said means including a series of endwise slidable bars, levers, one for each key bar, for locating said key bars in predetermined positions to which they may be moved in one direction and operating to stop said key bars against movement in the opposite direction, each of said levers being provided with a cam, an actuator, an arm operated by said actuator and arranged to engage said cam to release the said key bars, and means controlled by said actuator for returning said key bars to normal position after they have been released.

24. The combination of a series of independently movable value carrying wheels, one for each order of units, a series of gears, each in mesh with a value carrying wheel, for rotating said wheels, a transfer mechanism for carrying forward from each order of units to the next higher order of units, and a series of movable key members provided with teeth for driving said gears, each transfer mechanism comprising a spring operated device, means for locking and releasing said device, a plunger pivoted to and carried by said device and arranged to move the adjoining gear one point to carry, and means for positively maintaining said plunger in operative position during the operation of said device.

25. The combination of a series of independently movable value carrying wheels, one for each order of units, a series of gears, each in mesh with a value carrying wheel, for rotating said wheels, a transfer mechanism for carrying forward from each order of units to the next higher order of units, a series of movable key members provided with teeth for driving said gears, each transfer mechanism comprising a spring operated device, means for locking and releasing said device, a plunger pivoted to and carried by said device and arranged to move the adjoining gear one point to carry, and means for positively maintaining said plunger in operative position during the operation of said device, and for positively holding the plunger in an inoperative position during the restoring of said device to normal position, and means for restoring said devices to normal position.

26. The combination of a series of independently movable value carrying wheels, one for each order of units, a series of gears, each in mesh with a value carrying wheel, for rotating said wheels, a transfer mechanism for carrying forward from each order of units to the next higher order of units, and a series of movable key members provided with teeth for driving said gears, each transfer mechanism comprising a spring operated device, means for locking and releasing said device, a plunger pivoted to and carried by said device and arranged to move the adjoining gear one point to carry, a guide and lock plate, and a device carried by said plunger coöperating with said plate to positively maintain the plunger in a predetermined position during the operation of said device.

27. In mechanism of the class described, the combination of a series of wheels each provided with numerical characters, independently movable gears for rotating said wheels, movable key members for driving said gears, a series of slidably mounted spring operated devices, means interposed between each of said devices and an adjacent gear for locking and releasing said device, a plunger pivotally mounted on and movable with each of said devices and arranged to rotate the adjoining gear one point when said device is operated, means for restoring said devices to normal position, and means for positively preventing pivotal movement of the plungers during movement of said slidable devices.

28. In mechanism of the class described, the combination of a series of wheels each provided with numerical characters, independently movable gears for rotating said wheels, movable key members for driving said gears, a series of vertically movable devices, springs for operating said devices, means for supporting and locking said devices in elevated position with the springs under tension, a releaser carried by each of the gears for releasing the adjacent movable device, a plunger pivoted to and bodily moved by each of said movable devices and arranged to actuate the adjoining gear, a combined guide and lock plate for each plunger, and a projection carried by each plunger and coöperating with said plate to prevent pivotal movement of the plunger during movement with said movable device in either direction.

29. In mechanism of the class described, the combination of a series of wheels each provided with numerical characters, independently movable gears for rotating said wheels, movable key members for driving said gears, a series of vertically movable devices, springs for operating said devices, means for supporting and locking said devices in elevated position with the springs under tension, a releaser carried by each of the gears for releasing the adjacent movable device, a plunger pivoted to and bodily moved by each of said movable devices and arranged to actuate the adjoining gear, a combined guide and lock plate for each plunger, a projection carried by each plunger and coöperating with said plate to prevent pivotal movement of the plunger during movement with said movable device in either direction, and automatic means for returning said movable devices to elevated position.

30. In mechanism of the class described, the combination of a series of value carrying wheels, one for each order of units, means, including a series of gears, for rotating said wheels independently, a transfer mechanism for each order of units except the highest order, each transfer mechanism comprising a movable device, a spring for moving said device in one direction, means for locking and releasing said device, and a plunger carried by said device arranged to move the adjoining gear one point when said device is actuated by the adjacent spring, means for returning the device to locked position, the said plunger being pivoted to said device to permit it to free itself from the adjacent gear when returned to normal position, and means for guiding and maintaining said plunger against pivotal movement while said device is moving in either direction.

31. In mechanism of the class described, the combination of a series of value carrying wheels, one for each order of units, means, including a series of gears, for rotating said wheels independently, a transfer mechanism for each order of units except the highest order, each transfer mechanism comprising a movable device, a spring for moving said device in one direction, means for locking and releasing said device, and a plunger carried by said device arranged to move the adjoining gear one point when said device is actuated by the adjacent spring, means for returning the device to locked position, the said plunger being pivoted to said device to permit it to free itself from the adjacent gear when returned to normal position, a plate, and a projection carried by said plunger and coöperating with said plate to guide the plunger during its operation.

32. In mechanism of the class described, the combination of a series of value carrying wheels, one for each order of units, means, including a series of gears, for rotating said wheels independently, a transfer mechanism for each order of units except the highest order, each mechanism comprising a movable device, a spring for moving said device in one direction, means for locking and releasing said device, a plunger carried by said device arranged to move the adjoining gear one point when said device is actuated by the adjacent spring, means for returning the movable device to locked position, the said plunger being pivoted to said movable device to permit it to free itself from the adjacent gear when said device is returned to normal position, a plate, and a projection carried by said plunger and coöperating with said plate to guide the plunger during its operation, the said plate permitting the plunger to swing on its pivot at the limit of movement of said movable device in either direction.

33. The combination of a plurality of value carrying wheels, one for each order of units, means for rotating said wheels independently to add amounts, the said means including a series of gears, a transfer mechanism for each order of units, except the highest order, arranged to move the adjoining gear one point, and a device coöperating with each transfer mechanism normally disengaged from the adjoining gear for arresting the same during the return movement of the adjacent transfer mechanism.

34. The combination of a plurality of value carrying wheels, one for each order of units, means for rotating said wheels independently to add amounts, the said means including a series of gears, a transfer mechanism for each order of units, except the highest order, arranged to move the adjoining gear one point, and a device coöperating with and actuated by each transfer mechanism and normally disengaged from the adjoining gear for arresting the same during the return movement of the adjacent transfer mechanism.

35. The combination of a plurality of value carrying wheels, one for each order of units, means for rotating said wheels independently to add amounts, the said means including a series of gears, a transfer mechanism for each order of units, except the highest order, arranged to move the adjoining gear one point, and a slidable device coöperating with and actuated by each transfer mechanism and normally disengaged from the adjoining gear for arresting the same during the return movement of the adjacent transfer mechanism.

36. The combination of a plurality of value carrying wheels, one for each order of units, means for rotating said wheels independently to add amounts, the said means including a series of gears, a transfer mechanism for each order of units, except the highest order, arranged to move the adjoining gear one point, the said mechanism including a control member, a device actuated by said control member and normally disengaged from the adjoining gear for arresting the same during the return movement of the transfer mechanism.

37. The combination of a plurality of value carrying wheels, one for each order of units, means for rotating said wheels independently to add amounts, the said means including a series of gears, a transfer mechanism for each order of units except the highest order, arranged to move the adjoining gear one point, the said mechanism including a slidable member, a device bodily movable with said member and normally disengaged from the adjoining gear for arresting the same during the return movement of the transfer mechanism when said member is moved in one direction.

38. The combination of a plurality of value carrying wheels, one for each order of units, means for rotating said wheels independently to add amounts, the said means including a series of gears, a transfer mechanism for each order of units, except the highest order, arranged to move the adjoining gear one point, the said mechanism including a slidable member, a slidable device normally disengaged from the adjoining gear connected to and bodily movable with said member and arranged to arrest the adjoining gear during the return movement of the transfer mechanism when said member is moved in one direction.

39. The combination of a series of value carrying wheels, one for each order of units, gears for rotating said wheels, a series of endwise movable key bars provided with teeth for driving said gears, a transfer mechanism for each order of units except the highest order, each mechanism comprising a control member, and means for slidably supporting said member permitting it to move in a direction at substantially right angles to the direction of movement of said key bars, a device for each transfer mechanism normally disengaged from the adjoining gear for arresting the same during the return movement of said transfer mechanism, means for slidably supporting said device, and connections between each device and the control member of the adjacent transfer mechanism whereby said arresting device is moved thereby.

40. The combination of a series of value carrying wheels, one for each order of units, gears for rotating said wheels, a series of endwise movable key bars provided with teeth for driving said gears, automatic transfer mechanism for each order of units except the highest order, each mechanism comprising a control member, and means for slidably supporting said member permitting it to move in a direction at substantially right angles to the direction of movement of said key bars, a device for each transfer mechanism normally disengaged from the adjoining gear for arresting the same during the return movement of said transfer mechanism, means for slidably supporting said device, and connections between each device and the control member of the adjacent transfer mechanism whereby said arresting device is automatically moved thereby.

41. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, mechanism for returning the key bars to zero, paper supply means, and spring acting means tripped by the operation of said mechanism for making an impression by a positive stroke upon the paper from said printing characters of the number set up.

42. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, mechanism for returning the key bars to zero, paper supply means, and spring acting hammer mechanism tripped by the operation of said mechanism for making an impression by a positive stroke upon the paper from said printing characters of the number set up.

43. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, mechanism for returning the key bars to zero, paper supply means, and spring operated rebounding hammer mechanism tripped by the operation of said mechanism for making an impression by a positive stroke upon the paper from said printing characters of the number set up.

44. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, mechanism for returning the key bars to zero, paper supply means, spring operated rebounding hammer mechanism tripped by the operation of said mechanism for making an impression on the paper from said printing characters of the number set up, and means for placing said springs under tension to operate said mechanism.

45. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, paper supply means, a swingable frame, a spring for moving said frame in one direction, means for moving said frame in the opposite direction to place said spring under tension and releasing it to permit the spring to operate said frame, and a series of hammers carried by said frame and arranged to be impelled thereby against said printing characters with a positive stroke for making an impression therefrom.

46. The combination of a series of value carrying wheels, one for each order of units, means, including a series of endwise slidable key bars, for rotating said wheels independently to add amounts, printing characters carried by each of said bars and arranged in alinement with the characters of the other bars and adapted to be moved to a predetermined position for printing when said bars are operated to set up a number, paper supply means, a swingable frame, a spring for moving said frame in one direction, means for moving said frame in the opposite direction to place said spring under tension and releasing it to permit the spring to operate said frame, and a series of hammers carried by the frame and arranged to strike said printing characters to take a printing impression therefrom by a positive stroke upon said paper, each of said hammers being pivoted at one end to said swingable frame and arranged to move relative thereto within predetermined limits.

47. The combination of a series of value carrying wheels, one for each order of units, means, including a series of endwise sliable key bars, for rotating said wheels independently to add amounts, printing characters carried by each of said bars and arranged in alinement with the characters of the other bars and adapted to be moved to a predetermined position for printing when said bars are operated to set up a number, paper supply means, a swingable frame, a series of hammers carried by the frame and arranged to strike said printing characters to make a printing impression therefrom by a positive stroke upon the paper, each of said hammers being pivoted at one end to said swingable frame and arranged to move relative thereto within predetermined limits, compression springs for operating said frame, means for moving said frame to compress said springs and releasing it, and an abutment for arresting said frame and permitting said hammers to operate.

48. The combination of a series of value carrying wheels, gears for rotating said wheels, a series of endwise slidable key bars arranged side by side, a series of teeth pivoted to the upper edge of each of said bars arranged to rotate the adjacent gear when moved in one direction but to ride the teeth thereof when moved in the other direction, a series of printing characters carried by the lower edge of each key bar and arranged to be brought to a predetermined position to set up a number, mechanism for returning the key bars to zero, means for supporting a sheet of paper relative to said impression position, and spring means tripped by the operation of said returning mechanism for taking a printing impression from said characters.

49. The combination of a series of value carrying wheels, gears for rotating said wheels, a series of endwise slidable key bars arranged side by side, a series of teeth pivoted to the upper edge of each of said bars arranged to rotate the adjacent gear when moved in one direction but to ride the teeth thereof when moved in the other direction, a series of printing characters carried by the lower edge of each key bar and arranged to be brought to a predetermined position to set up a number, mechanism for returning the key bars to zero, means for supporting a sheet of paper relative to said impression position, and automatically operated means tripped by the operation of said returning mechanism for taking a printing impression from said characters.

50. The combination of a series of value carrying wheels, gears for rotating said wheels, a series of endwise slidable key bars arranged side by side, a series of teeth pivoted to the upper edge of each of said bars arranged to rotate the adjacent gear when moved in one direction but to ride the teeth thereof when moved in the other direction, a series of printing characters carried by the lower edge of each key bar and arranged to be brought to a predetermined position to set up a number, mechanism for returning the key bars to zero, means for supporting a sheet of paper relative to said impression position, and rebounding hammer mechanism tripped by the operation of said returning mechanism for taking a printing impression from said characters.

51. The combination of a series of value carrying wheels, gears for rotating said wheels, a series of endwise slidable key bars arranged side by side, a series of teeth pivoted to the upper edge of each of said bars arranged to rotate the adjacent gear when moved in one direction but to ride the teeth thereof when moved in the other direction, a series of printing characters carried by the lower edge of each key bar and arranged to be brought to a predetermined position to set up a number, means for supporting a sheet of paper relative to said predetermined position, spring operated printing means, an actuator, connections between said actuator and said printing means for tripping the latter, and means arranged to be operated by said actuator for returning said bars to normal position after the operation of the printing means.

52. The combination of a series of value carrying wheels, gears, one for each wheel, for rotating said wheels, a series of endwise slidable key bars having teeth arranged to engage with and drive said gears, printing characters carried by each of said bars and arranged to be moved to printing position, means for supplying a transfer sheet below said printing characters, a holding frame for receiving and supporting a transaction slip, and means for making a printing impression from said characters to said transaction slip.

53. The combination of a series of value carrying wheels, gears, one for each wheel, for rotating said wheels, a series of endwise slidable key bars having teeth arranged to engage with and drive said gears, printing characters carried by each of said bars and arranged to be moved to printing position, means for supplying a transfer sheet below said printing characters, a holding frame for receiving and supporting a transaction slip, and automatic hammer mechanism for making a printing impression from said characters to said transaction slip.

54. The combination of a series of value carrying wheels, gears, one for each wheel, for rotating said wheels, a series of endwise slidable key bars having teeth arranged to engage with and drive said gears, printing characters carried by each of said bars and arranged to be moved to a predetermined printing position, means for supplying a pair of superposed strips of paper below said printing characters, said strips being coated with a transfer medium on their lower surfaces, a frame for receiving and holding a transaction slip below the strips of paper, and means for causing an impression to be made from said printing characters, whereby the number set up is printed on one of said strips and on the transaction slip.

55. The combination of a series of value carrying wheels, gears, one for each wheel, for rotating said wheels, a series of endwise slidable key bars having teeth arranged to engage with and drive said gears, printing characters carried by each of said bars and arranged to be moved to printing position, means for supplying a pair of superposed strips of paper below the printing characters, said strips being coated with a transfer medium on their lower surfaces, a frame for receiving and holding a transaction slip below said strips of paper, means for causing an impression to be made from said printing characters, whereby the number set up is printed on one of said strips and on the transaction slip, and means for feeding the lowermost strip of paper step by step, whereby each number set up is listed thereon.

56. The combination of a series of value carrying wheels, gears, one for each wheel, for rotating said wheels, a series of endwise slidable key bars having teeth arranged to engage with and drive said gears, printing characters carried by each of said bars and arranged to be moved to a predetermined position for printing, means for supplying a pair of superposed strips of paper relative to the printing position, said strips being coated with a transfer medium on their lower surfaces, a frame for receiving and holding a transaction slip below said strips of paper, means for causing an impression to be made from said printing characters, whereby the number set up is printed on one of said strips and on the transaction slip, and automatic means for feeding the lowermost strip of paper step by step, whereby each number set up is listed thereon.

57. The combination of a series of value carrying wheels, gears, one for each wheel, for rotating said wheels, a series of endwise slidable key bars having teeth arranged to engage with and drive said gears, printing characters carried by each of said bars and arranged to be moved to a predetermined position for printing, means for supplying a pair of superposed strips of paper relative to and below said printing position, said strips being coated with a transfer medium on their lower surfaces, a frame for receiving and holding a transaction slip below said strips of paper, means for causing an impression to be made from said printing characters, whereby the number set up is printed on one of said strips and on the transaction slip, means for returning the key bars to normal position, and means operated by said key bar return means for feeding the lowermost strip of paper upon each operation thereof.

58. The combination of a series of value carrying wheels, means for rotating said wheels, the said means including a series of movable key bars carrying printing characters arranged to set up a number when said key bars are operated, means for supplying a strip of paper below and relative to said characters, an actuator, means, having connections with and operated by said actuator, for making a printing impression from said characters on to the paper strip, means, having connections with and operated by said actuator, for returning said key bars to normal position, and means operated by said bar return means for feeding the strip of paper a predetermined distance at each operation thereof, the said bar return means being arranged to operate after the printing impression has been completed.

59. The combination of a series of value carrying wheels, means for rotating said wheels, the said means including a series of movable key bars carrying printing characters arranged to set up a number when said key bars are operated, means for supplying a strip of paper relative to said characters, an actuator, means, having connections with and operated by said actuator, for making a printing impression from said characters on to the paper strip, means having connections with and operated by said actuator, for returning said key bars to normal position, a pair of feed rollers between which the paper strip extends, a ratchet fixed to one of the rollers, and a pawl carried by said bar return means and arranged to engage said ratchet for rotating the adjacent roller at each operation of the bar return means.

60. The combination of a series of value carrying wheels, means for rotating said wheels, the said means including a series of movable key bars carrying printing characters arranged to set up a number when said key bars are operated, means for supplying a strip of paper relative to said characters, an actuator, means, having connections with and operated by said actuator, for making a printing impression from said characters on to the paper strip, means, having connections with and operated by said actuator, for returning said key bars to normal position, a pair of feed rollers between which the paper strip extends, a ratchet fixed to one of the rollers, a pawl carried by said bar return means and arranged to engage said ratchet for rotating the adjacent roller at each operation of the bar return means, and means for swingably supporting one of said rollers to permit the introduction of the paper strip therebetween.

61. The combination of a series of value carrying wheels, means for rotating said carrying wheels, the said means including a series of movable key bars carrying printing characters arranged to set up a number when said key bars are operated, means for supplying a strip of paper relative to said characters, an actuator, means, having connections with and operated by said actuator for making a printing impression from said characters on to the paper strip, means, having connections with and operated by said actuator for returning said key bars to normal position, a pair of feed rollers between which the paper strip extends, a ratchet fixed to one of the rollers, a pawl carried by said bar return means and arranged to engage said ratchet for rotating the adjacent roller at each operation of the bar return means, means for swingably supporting one of said rollers to permit the introduction of the paper strip therebetween, and a spring tending to keep said swingably mounted roller in engagement with the other roller.

62. In apparatus of the character described, the combination of a plurality of slidable bars, a series of value carrying wheels, means interposed between certain of said bars and said wheels for rotating the latter to add amounts, printing characters carried by each of said bars and coöperating to set up numbers when said bars are operated, mechanism for making an impression from said printing characters, means for stopping each one of said bars against return movement after operation, and devices for releasing certain ones only of said bars from said stopping means.

63. In apparatus of the character described, the combination of a plurality of slidable bars, a series of value carrying wheels, means interposed between certain of said bars and said wheels for rotating the latter to add amounts, printing characters carried by each of said bars and coöperating to set up numbers when said bars are operated, mechanism for making an impression from said printing characters, means for stopping said bars against return movement after operation, means for returning said bars to normal position including devices for releasing said locking means from said bars, and separate means for releasing certain of said bars from said stopping means.

64. In apparatus of the character described, the combination of a plurality of slidable bars, a series of value carrying wheels, means interposed between certain of said bars and said wheels for rotating the latter to add amounts, printing characters carried by each of said bars and coöperating to set up numbers when said bars are operated, mechanism for making an impression from said printing characters, means for stopping said bars against return movement after operation, means for returning said bars to normal position including devices for releasing said locking means from said bars, and separate means for releasing certain of said bars from said stopping means, the said separate lock-releasing means being operable independently of said bar return means.

65. The combination of a series of value carrying wheels, means for operating said wheels to add amounts, an individual printing mechanism including means for feeding a strip of paper relative to said individual printing mechanism, a total printing mechanism operable independently of the adding mechanism for printing any one of the amounts added thereby, means operable independently of said total printing mechanism for resetting the value carrying wheels to zero, and means automatically operated by said resetting means for indicating on the paper strip the point where resetting occurred.

66. The combination of a series of value carrying wheels, means for operating said wheels to add amounts, individual printing mechanism including means for feeding a strip of paper relative to the printing mechanism, means for resetting said value carrying wheels to zero, and eccentric means operated by said resetting means for indicating on the paper strip the point where resetting occurred.

67. The combination of a series of value carrying wheels, means for operating said wheels to add amounts, individual printing mechanism including means for feeding a strip of paper relative to the printing mechanism, means for resetting said value carrying wheels to zero, and means automatically operated by said resetting means for piercing the paper strip to indicate the point where resetting occurred.

68. The combination of a series of value carrying wheels, means for operating said wheels to add amounts, individual printing mechanism including means for feeding a strip of paper relative to the printing mechanism, means for resetting said value carrying wheels to zero, a plunger arranged to engage with the paper strip to indicate where resetting of said wheels occurred, and eccentric mechanism between said resetting means and said plunger for operating the latter.

69. The combination of a series of value carrying wheels, means for operating said wheels to add amounts, individual printing mechanism including means for feeding a strip of paper relative to the printing mechanism, means for resetting said value carrying wheels to zero, a plunger arranged to engage with the paper strip to indicate where resetting of said wheels occurred, eccentric mechanism between said resetting means and said plunger for operating the latter, and means for locking said resetting means at the zero position.

70. The combination of a series of register wheels provided with printing characters, means for operating said wheels to add amounts, mechanism coöperating with said wheels to take impressions from the characters thereon, the said mechanism comprising a frame for positioning a strip of paper relative to said wheels, a sliding plunger platen for pressing the paper against the characters and means for reciprocating said platen to imprint the paper, and means operated by said reciprocating means for inking the said characters during the printing movements of the platen.

71. The combination of a series of register wheels carrying numerical characters adapted to add and to print, means for supporting and positioning a sheet of paper relative to said characters, a sliding plunger platen arranged to press the paper against the characters to make an impression therefrom, and a lever for reciprocating said platen toward and from said characters, the said lever being provided with inking means and arranged to move said means over the printing characters when the platen is being moved away from said characters and to again move the inking means over and then away from the characters when the platen is moved toward them.

72. The combination of a series of register wheels carrying numerical characters adapted to add and to print, means for supporting and positioning a sheet of paper relative to said characters, a movable platen arranged to press the paper against the characters to make an impression therefrom, a lever for reciprocating said platen toward and from said characters, the said lever being provided with inking means and arranged to move said means over the printing characters when the platen is being moved away from said characters and to again move the inking means over and then away from the characters when the platen is moved toward them, and compression means for moving the lever in one direction to move the platen away from said characters.

73. The combination with a support, of a series of register wheels carrying numerical characters adapted to register amounts and to print the total thereof, a pair of spaced frames mounted on the support, a plunger provided with a platen, arranged to press a strip of paper against the characters, means for slidably supporting said plunger between the frames, a lever pivoted between the frames and provided with inking means for inking the characters, and connections between said plunger and lever arranged upon that side of its pivot opposite to the inking means, whereby said platen and inking means are alternately operated, the frames being removably connected with said support.

74. The combination of a series of register wheels provided with printing characters, means for operating said wheels to add amounts, mechanism coöperating with said wheels to take impressions from the characters thereon, the said mechanism comprising a frame for positioning a strip of paper relative to said wheels, a slidable platen for pressing the paper against the characters and means for reciprocating said platen, and means operated by said reciprocating means for inking the said characters, the said inking means comprising a roller and means for yieldably supporting said roller on said reciprocating means.

In testimony whereof I affix my signature, in the presence of two witnesses.

CHARLES F. LAGANKE.

Witnesses:
R. H. JAMISON,
EDWARD R. ALEXANDER.

Copies of this patent may be obtained for five cents each, by addressing the "Commissioner of Patents, Washington, D. C."